(12) United States Patent
Shiraishi

(10) Patent No.: US 8,934,727 B2
(45) Date of Patent: Jan. 13, 2015

(54) IMAGE PROCESSING APPARATUS, IMAGE PROCESSING METHOD, AND IMAGE FORMING APPARATUS

(71) Applicant: Naoto Shiraishi, Kanagawa (JP)

(72) Inventor: Naoto Shiraishi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 181 days.

(21) Appl. No.: 13/727,982

(22) Filed: Dec. 27, 2012

(65) Prior Publication Data
US 2013/0176590 A1 Jul. 11, 2013

(30) Foreign Application Priority Data
Jan. 5, 2012 (JP) .................. 2012-000832

(51) Int. Cl.
G06K 9/36 (2006.01)
G06F 3/12 (2006.01)
H04N 1/415 (2006.01)

(52) U.S. Cl.
CPC .............. G06F 3/1297 (2013.01); H04N 1/415 (2013.01)
USPC .......................................... 382/232; 382/246

(58) Field of Classification Search
USPC .............. 382/232–233, 244–246; 341/65, 67, 341/106; 358/1.18, 426.01–426.07, 426.13
See application file for complete search history.

(56) References Cited

U.S. PATENT DOCUMENTS

| 5,003,307 | A | | 3/1991 | Whiting et al. |
| 5,016,009 | A | | 5/1991 | Whiting et al. |
| 5,126,739 | A | | 6/1992 | Whiting et al. |
| 5,146,221 | A | | 9/1992 | Whiting et al. |
| 5,414,425 | A | | 5/1995 | Whiting et al. |
| 5,452,093 | A | * | 9/1995 | Kwak ............................ 358/296 |
| 5,463,390 | A | | 10/1995 | Whiting et al. |
| 5,506,580 | A | | 4/1996 | Whiting et al. |
| 5,532,694 | A | * | 7/1996 | Mayers et al. .................. 341/67 |
| 5,663,726 | A | * | 9/1997 | Bakhmutsky ................... 341/67 |
| 6,268,809 | B1 | * | 7/2001 | Saito ............................... 341/51 |
| 7,760,954 | B2 | * | 7/2010 | Singh ............................ 382/244 |
| 8,004,714 | B2 | * | 8/2011 | Metcalfe et al. ............. 358/1.18 |
| 2002/0167429 | A1 | * | 11/2002 | Kim ............................. 341/106 |
| 2002/0191224 | A1 | * | 12/2002 | Yagishita et al. ........ 358/426.07 |
| 2005/0162287 | A1 | | 7/2005 | Cockburn et al. |

(Continued)

FOREIGN PATENT DOCUMENTS

| JP | 2713369 | 10/1997 |
| JP | 3730385 | 10/2005 |

(Continued)

*Primary Examiner* — Ishrat I Sherali
(74) *Attorney, Agent, or Firm* — Oblon, Spivak, McClelland, Maier & Neustadt, L.L.P.

(57) ABSTRACT

An image processing apparatus includes a detecting unit configured to detect different predetermined periods in parallel in image data line by line; a selecting unit configured to select a longest period in the periods that are acquired by the detecting unit through detection of the periods with respect to a piece of image data corresponding to one line; a dividing unit configured to divide the piece of image data corresponding to the one line into pieces of division data in accordance with the period selected by the selecting unit; a converting unit configured to convert each of the pieces of division data into a piece of intermediate data, the division data being obtained by dividing the piece of image data corresponding to the one line by the dividing unit; and an encoding unit configured to perform compression coding on the piece of intermediate data converted by the converting unit.

11 Claims, 33 Drawing Sheets

(56) References Cited

U.S. PATENT DOCUMENTS

| | | | |
|---|---|---|---|
| 2009/0060325 A1* | 3/2009 | Shiraishi | 382/166 |
| 2011/0280492 A1* | 11/2011 | Shiraishi | 382/251 |
| 2012/0162715 A1* | 6/2012 | Shiraishi | 358/1.16 |
| 2014/0139858 A1* | 5/2014 | Shiraishi | 358/1.13 |

FOREIGN PATENT DOCUMENTS

| | | |
|---|---|---|
| JP | 3922386 | 3/2007 |
| JP | 4000266 | 8/2007 |
| WO | WO 03/096544 A1 | 11/2003 |

* cited by examiner

FIG.6

| CODE NAME | CODE TABLE | CODE SIZE TABLE |
|---|---|---|
| ESC | 0b000_ESC (8 BITS) | 11 |
| | 0b000_ESC (16 BITS) | 19 |
| | 0b000_ESC (32 BITS) | 35 |
| INDEX00 | 0b001 | 3 |
| INDEX01 | 0b010 | 3 |
| INDEX02 | 0b011 | 3 |
| INDEX03 | 0b1000 | 4 |
| INDEX04 | 0b1001 | 4 |
| INDEX05 | 0b110100 | 6 |
| INDEX06 | 0b110101 | 6 |
| INDEX07 | 0b110110 | 6 |
| INDEX08 | 0b110111 | 6 |
| INDEX09 | 0b1110000 | 7 |
| INDEX10 | 0b1110001 | 7 |
| INDEX11 | 0b1110010 | 7 |
| INDEX12 | 0b1110011 | 7 |
| INDEX13 | 0b1110100 | 7 |
| INDEX14 | 0b1110101 | 7 |
| INDEX15 | 0b1110110 | 7 |
| LINE HEADER | 0b1111000 (8 BITS) | 7 |
| | 0b1111001 (16 BITS) | 7 |
| | 0b1111010 (32 BITS) | 7 |
| CODE END | 0b11111 | 5 |

| ADDRESS | OUTPUT |
|---|---|
| 4'b0000 | 0 |
| 4'b0001 | 1 |
| 4'b0010 | 1 |
| 4'b0011 | 2 |
| 4'b0100 | 1 |
| 4'b0101 | 2 |
| 4'b0110 | 2 |
| 4'b0111 | 3 |
| 4'b1000 | 1 |
| 4'b1001 | 2 |
| 4'b1010 | 2 |
| 4'b1011 | 3 |
| 4'b1100 | 2 |
| 4'b1101 | 3 |
| 4'b1110 | 3 |
| 4'b1111 | 4 |

FIG.19A

| DICTIONARY DATA | INDEX |
|---|---|
| 0x0123_0000 | 00 |
| 0x4567_0000 | 01 |
| 0x89AB_0000 | 02 |
| 0xCDEF_0000 | 03 |
| 0x3210_0000 | 04 |
| 0x7654_0000 | 05 |
| 0xBA98_0000 | 06 |
| 0xFEDC_0000 | 07 |
| 0x0000_0000 | 08 |
| 0x1111_0000 | 09 |
| 0x2222_0000 | 10 |
| 0x3333_0000 | 11 |
| 0x4444_0000 | 12 |
| 0x5555_0000 | 13 |
| 0x6666_0000 | 14 |
| 0x7777_0000 | 15 |

INPUT DATA 0x5555 → 0x5555_0000

FIG.19B

| DICTIONARY DATA | INDEX |
|---|---|
| 0x0123_4567 | 00 |
| 0x4567_89AB | 01 |
| 0x89AB_CDEF | 02 |
| 0xCDEF_0123 | 03 |
| 0x3210_0123 | 04 |
| 0x7654_5678 | 05 |
| 0xBA98_8976 | 06 |
| 0xFEDC_0123 | 07 |
| 0x0000_0000 | 08 |
| 0x1111_1111 | 09 |
| 0x2222_2222 | 10 |
| 0x3333_3333 | 11 |
| 0x4444_4444 | 12 |
| 0x5555_5555 | 13 |
| 0x6666_6666 | 14 |
| 0x7777_7777 | 15 |

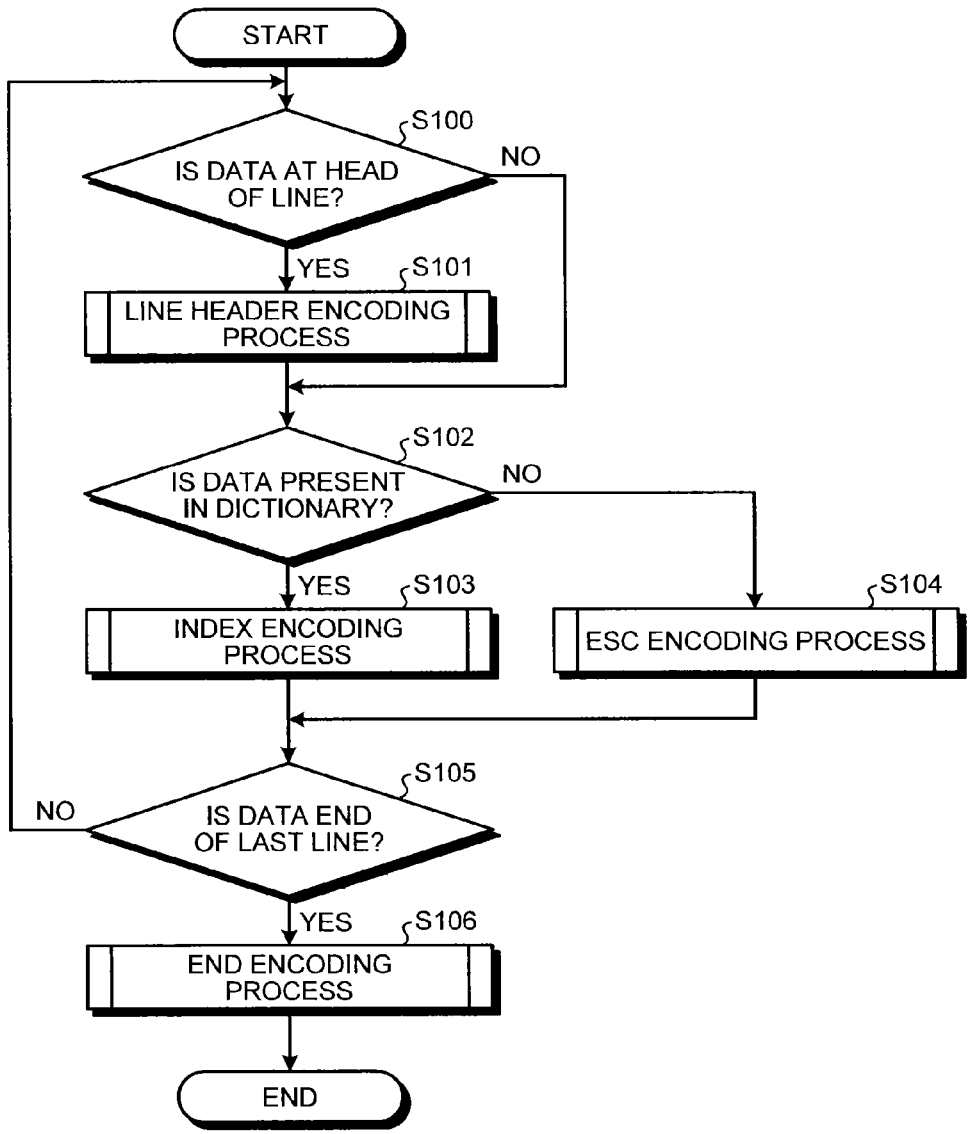

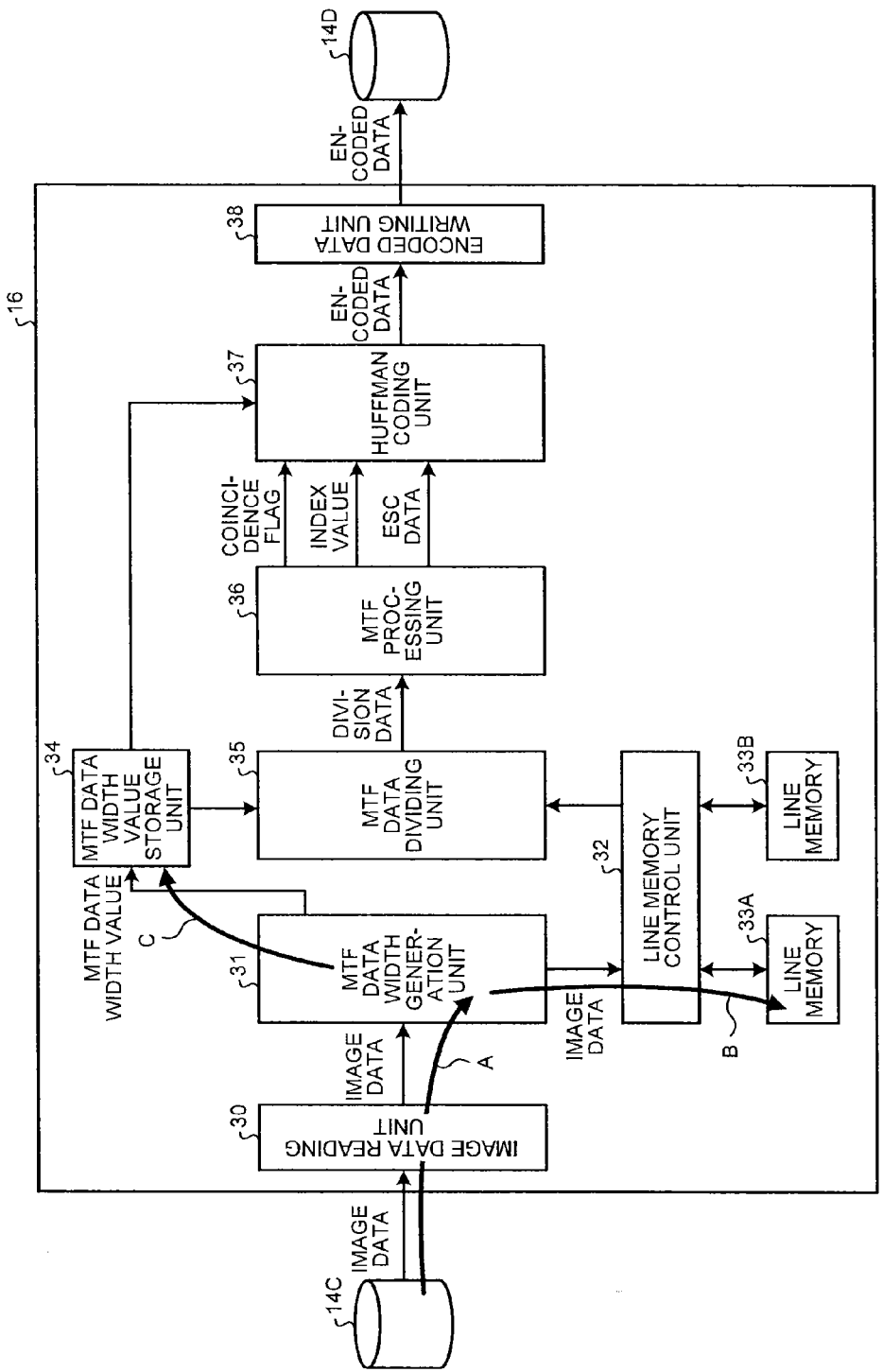

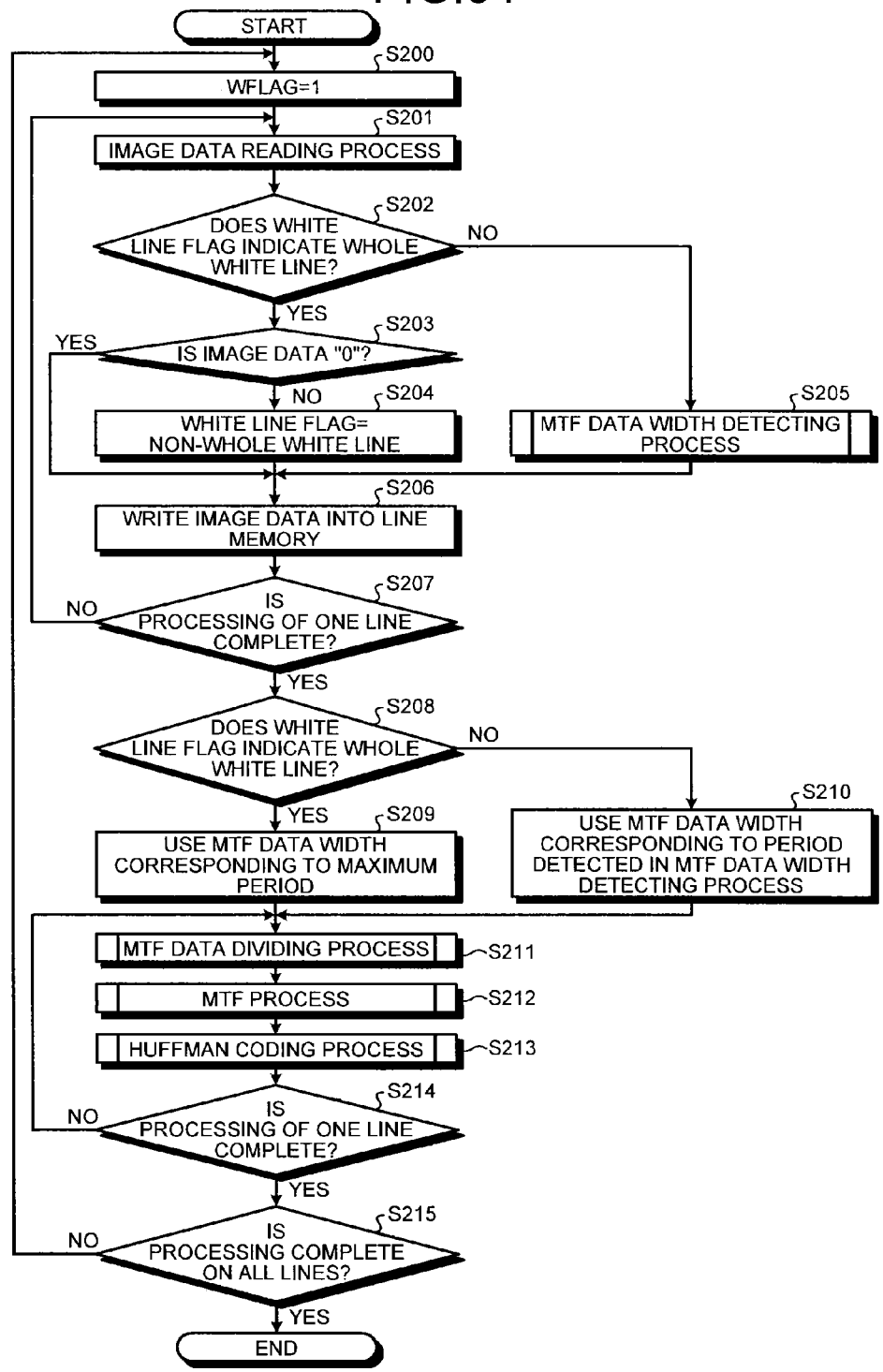

IMAGE PROCESSING APPARATUS, IMAGE PROCESSING METHOD, AND IMAGE FORMING APPARATUS

CROSS-REFERENCE TO RELATED APPLICATION

The present application claims priority to and incorporates by reference the entire contents of Japanese Patent Application No. 2012-000832 filed in Japan on Jan. 5, 2012.

BACKGROUND OF THE INVENTION

1. Field of the Invention

The present invention relates to an image processing apparatus, an image processing method, and an image forming apparatus including the image processing apparatus.

2. Description of the Related Art

Image forming apparatuses such as printers temporarily store image data in memories. When the image data is stored in the memories without any change, the memories are required to have high capacity, thereby increasing the price of the memories. In order to avoid such an increase in price, the image data is compressed and stored in the memories.

Such printers perform a printing process in the following manner, for example. The printer analyzes a page description language (PDL) that is produced by a computer, for example, and received through a network or the like and produces an intermediate language executable by a rendering unit. The rendering unit analyzes the intermediate language and draws an image after a gradation process to a band memory. The drawn image data is compression-coded by a compression coding algorithm for binary image and the produced encoded data is stored in a memory. In printing operation, the encoded data is read from the memory while being delayed for each of the color planes of cyan, magenta, yellow, and black (CMYK), and decoded, and the decoded data is transferred to printer engines, which process the data corresponding to the respective color planes of CMYK and print the image.

As a method of efficiently compressing data, a method of compressing data by universal coding has been put into practical use. The universal coding is a lossless data compression method and is applicable to various types of data (such as character codes and object codes) because statistical nature of information sources is not presupposed in data compression.

A typical universal coding is Ziv-Lempel coding. In the Ziv-Lempel coding, a universal type algorithm and an incremental parsing type algorithm have been proposed. A practical technique using the universal type algorithm is Lempel-Ziv-Storer-Syzmanaski (LZSS) coding.

In the coding algorithm of LZ77 coding, which is the base of the LZSS coding, target data for encoding is divided as a maximum length string of data matched with the data in past data string from an arbitrary position in the past data string and encoded as the duplicate of the past data string.

More specifically, a moving window that stores encoded input data and a lookahead buffer that stores data to be encoded are provided. The data string in the lookahead buffer are compared with all partial strings of the data string in the moving window, and a longest matching partial string in the moving window is obtained. In order to designate the longest matching partial string in the moving window, a set of "a start position of the longest matching partial string", "a matching length", and "a next symbol causing a mismatch" is encoded.

Then, the encoded data string in the lookahead buffer is shifted to the moving window and a new data string having the same data length as the encoded data string is input in the lookahead buffer. Thereafter, the same processing is repeated, so that data is decomposed into partial data strings and encoded.

In general, the LZSS coding needs to detect the longest matching with an input data string as many times as the number of moving windows storing the encoded input data. As a result, an amount of calculation is increased, but a high compression ratio can be obtained.

Another practical technique using the universal type algorithm in the Ziv-Lempel coding is Lempel, Ziv, Welch (LZW) coding. In the LZW coding, a rewritable dictionary is provided and input character strings are divided into different character strings. The character strings are designated with numbers in the order they appear and registered in the dictionary. In addition, a currently input character string is encoded by being represented only by a dictionary number of a longest matching character string registered in the dictionary. Compared with the LZSS coding, the LZW coding is lower in the compression ratio, but is simpler, easier in calculation, and can achieve higher speed processing. Thus, the LZW coding has been widely used for file compression in storage devices and data transfer, for example.

In the LZ77 technique, it takes long time in searching for the longest matching character string in coding. In order to speed up the LZ77 coding, it is effective to perform the search process with higher speed. A technique that performs run length coding on an index value coincident with a small dynamic dictionary by move to front (MTF) control of the dictionary is described in Japanese Patent No. 4,000,266.

The technique described in Japanese Patent No. 4000266, however, is inefficient when the length of a word to be registered in the dictionary is short. As a result, high speed processing is not expected. For example, when the length of the word registered in the dictionary is 1 byte and the depth of the dictionary is 64, the data length is only converted from 8 bits to 6 bits even when the index value is coincident with the dictionary. For a further increase in efficiency, the lengths of words in the dictionary need to be increased. The increase in length of words, however, causes the coincidence with the dictionary to be hardly achieved. To address such difficulties, the lengths of the words are obtained by period detection in Japanese Patent No. 4000266.

The encoding process using the period detection needs to use any of a two-path method or pipeline processing. In the two-path method, the encoding process is divided into two stages, which are a period detecting process and an encoding process. The data to be encoded is first passed to the stage of the period detecting process, in which the period of the data is obtained, and thereafter the data is passed to the stage of the encoding process, in which the encoding process is performed using the period obtained by the stage of the period detecting process. In this pipeline processing, the period detecting process and the encoding process are pipelined using working memories such as line memories.

The two-path method needs to take extra time because the coding is performed at the two stages. As a result, high speed processing is hardly achieved. In the pipeline processing, memories having a relatively large capacity need to be prepared as the working memories, resulting in an increase in costs. In this way, the related-art coding method using the LZ77 technique has a problem in that it is difficult to efficiently perform coding regardless of the data length for determining the coincidence with the data string.

Therefore, there is a need for an image processing apparatus enabling the compression coding of the image data to be more efficiently performed.

SUMMARY OF THE INVENTION

It is an object of the present invention to at least partially solve the problems in the conventional technology.

According to an embodiment, there is provided an image processing apparatus that includes a detecting unit configured to detect different predetermined periods in parallel in image data line by line; a selecting unit configured to select a longest period in the periods that are acquired by the detecting unit through detection of the periods with respect to a piece of image data corresponding to one line; a dividing unit configured to divide the piece of image data corresponding to the one line into pieces of division data in accordance with the period selected by the selecting unit; a converting unit configured to convert each of the pieces of division data into a piece of intermediate data, the division data being obtained by dividing the piece of image data corresponding to the one line by the dividing unit; and an encoding unit configured to perform compression coding on the piece of intermediate data converted by the converting unit.

According to another embodiment, there is provided an image forming apparatus that includes the image processing apparatus according to the above embodiment; a storage unit configured to store therein encoded data obtained through the compression coding by the encoding unit; a decoding unit configured to decode the encoded data stored in the storage unit to image data; and an image forming unit configured to form an image on a printing medium on the basis of the image data decoded by the decoding unit.

According to still another embodiment, there is provided an image processing method that includes detecting, by a detecting unit, different predetermined periods in parallel in image data line by line; selecting, by a selecting unit, a longest period in the periods that are acquired by the detecting unit through detection of the periods with respect to a piece of image data corresponding to one line; dividing, by a dividing unit, the piece of image data corresponding to the one line into pieces of division data in accordance with the period selected by the selecting unit; converting, by a converting unit, each of the pieces of division data into a piece of intermediate data, the division data being obtained by dividing the piece of image data corresponding to the one line by the dividing unit; and performing, by an encoding unit, compression coding on the piece of intermediate data converted by the converting unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a schematic diagram illustrating an exemplary format of codes used in a Huffman coding unit;

FIGS. 19A and 19B are schematic diagrams to explain a dictionary including dictionary data having a data length corresponding to a period that is not a detected maximum period;

FIG. 20 is an exemplary flowchart illustrating overall processing in the Huffman coding unit;

FIGS. 26A and 26B are schematic diagrams to explain pipeline processing in the first embodiment;

FIG. 34 is an exemplary flowchart illustrating encoding process in the second embodiment.

DETAILED DESCRIPTION OF THE PREFERRED EMBODIMENTS

Embodiments of an image processing apparatus, an image processing method, and an image forming apparatus according to the invention are described below in detail with reference to the accompanying drawings.

First Embodiment

Figure 1:
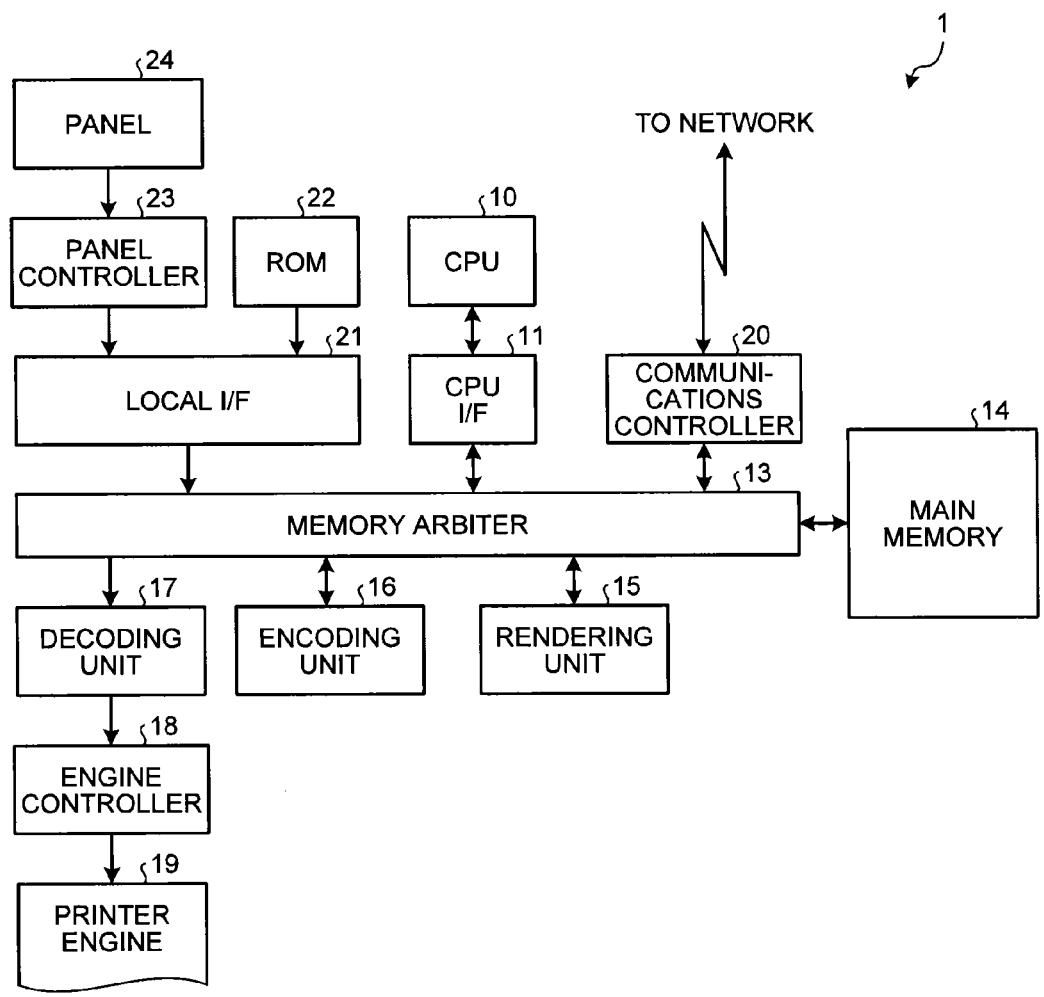
FIG. 1 is a block diagram illustrating an exemplary structure of an image forming apparatus according to a first embodiment.

FIG. 1 is a block diagram illustrating an exemplary structure of an image forming apparatus 1 according to a first embodiment of the present invention. In the image forming apparatus 1, a central processing unit (CPU) 10 is coupled to a memory arbiter 13 through a CPU interface (I/F) 11, and a read only memory (ROM) 22 and a panel controller 23 are coupled to the memory arbiter 13 through a local I/F 21. The memory arbiter 13 has a memory controller (not illustrated), through which a main memory 14 is coupled to the memory arbiter 13. In addition, a rendering unit 15, an encoding unit 16, a decoding unit 17, and a communications controller 20 are connected to the memory arbiter 13. The output of the decoding unit 17 connects to an engine controller 18 that controls a printer engine 19.

The memory arbiter 13 arbitrates data transfer among the components connected thereto. The CPU I/F 11 is an interface between the CPU 10 and the memory arbiter 13. The CPU 10 is coupled to each component of the image forming apparatus 1 through the CPU I/F 11 and the memory arbiter 13. The panel controller 23 connects to a panel 24 provided with an operation element and a display for user's operation.

The ROM 22 preliminarily stores therein various programs and font information such as characters. The CPU 10 controls the operation of the image forming apparatus 1 in accordance with the programs preliminarily stored in the ROM 22 using a random access memory (RAM), which is not illustrated, as a working memory. The CPU 10 can use the main memory 14 as the working memory. The CPU 10 outputs commands for controlling the printer engine 19 to the engine controller 18. The communications controller 20 controls communications between the image forming apparatus 1 and an external apparatus, such as a personal computer (PC), coupled to the communications controller 20 through a network.

Figure 2:
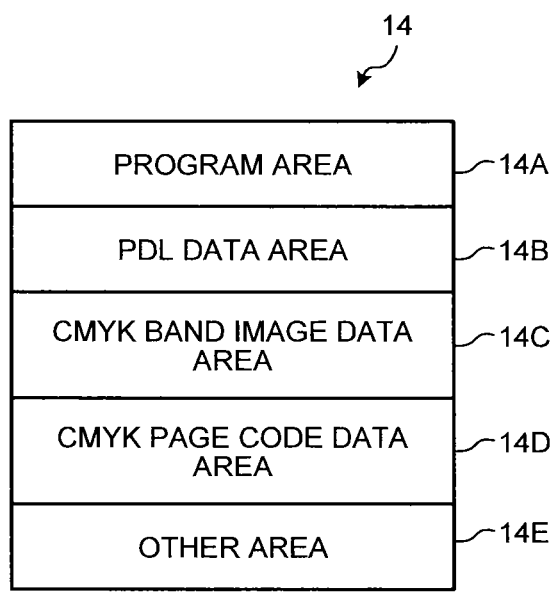
FIG. 2 is a schematic diagram illustrating an exemplary structure of a main memory.

The memory controller included in the memory arbiter 13 controls accesses to the main memory 14 through the memory arbiter 13. FIG. 2 illustrates an exemplary structure of the main memory 14. The main memory 14 includes a program area 14A, a page description language (PDL) data area 14B, a cyan-magenta-yellow-black (CMYK) band image data area 14C, a CMYK page code data area 14D, and the other area 14E, for example.

The program area 14A stores therein programs used for operating the CPU 10, for example. The PDL data area 14B stores therein PDL data transferred from a personal computer through the communications controller 20, for example. An intermediate language produced by the CPU 10 on the basis of the PDL data may be stored in the PDL data area 14B. The CMYK band image data area 14C stores therein band image data of the respective colors, i.e., C, M, Y, and K (also referred to as respective color planes of CMYK), produced on the basis of the PDL data, for each color. The CMYK page code data area 14D stores therein encoded band image data of the respective color planes of CMYK. The other area 14E stores therein data other than the above-described data. For example, the other area 14E can be used as the working memory when the CPU 10 executes the programs.

The rendering unit 15 reads and analyzes the intermediate language produced by the CPU 10 on the basis of the PDL data, and performs a rendering process to write band images in the band image storage area of the main memory 14 in accordance with the analysis results. For example, the band images drawn by the rendering unit 15 are read from the main memory 14, sent through the memory arbiter 13 to the encoding unit 16 for being subjected to an encoding process and the decoding unit 17 for being subjected to a decoding process, and thereafter supplied to the engine controller 18. The engine controller 18 controls the printer engine 19 in accordance with the supplied band images. As a result, images are formed on printing media as a result of a printing process.

In the structure thus described, the PDL data produced by the personal computer is received by the communications controller 20 through the network and stored in the PDL data area 14B of the main memory 14, for example. The CPU 10 reads the PDL data from the PDL data area 14B of the main memory 14, analyzes the PDL data, produces the intermediate language on the basis of the analysis results, and stores the intermediate language in the main memory 14. The rendering unit 15 performs the rendering process in accordance with the intermediate language read from the main memory 14, and produces the image data of the respective color planes of CMYK. The produced image data of the respective color planes of CMYK is written in the CMYK band image data area 14C of the main memory 14.

The encoding unit 16 performs a compression coding process on the band image data of the respective color planes of CMYK read from the CMYK band image data area 14C of the main memory 14 by a compression coding method using move to front (MTF) control and Huffman coding. The encoded data obtained by the compression coding of the band image data is stored in the CMYK page code data area 14D of the main memory 14. The decoding unit 17 decodes the encoded data of the respective color planes of CMYK read from the CMYK page code data area 14D of the main memory 14, outputs the image data of the respective color planes of CMYK, and sends the image data to the engine controller 18. The engine controller 18 controls the printer engine 19 for printing out images in accordance with the image data of the respective color planes of CMYK received from the decoding unit 17.

Encoding Unit

Figure 3:
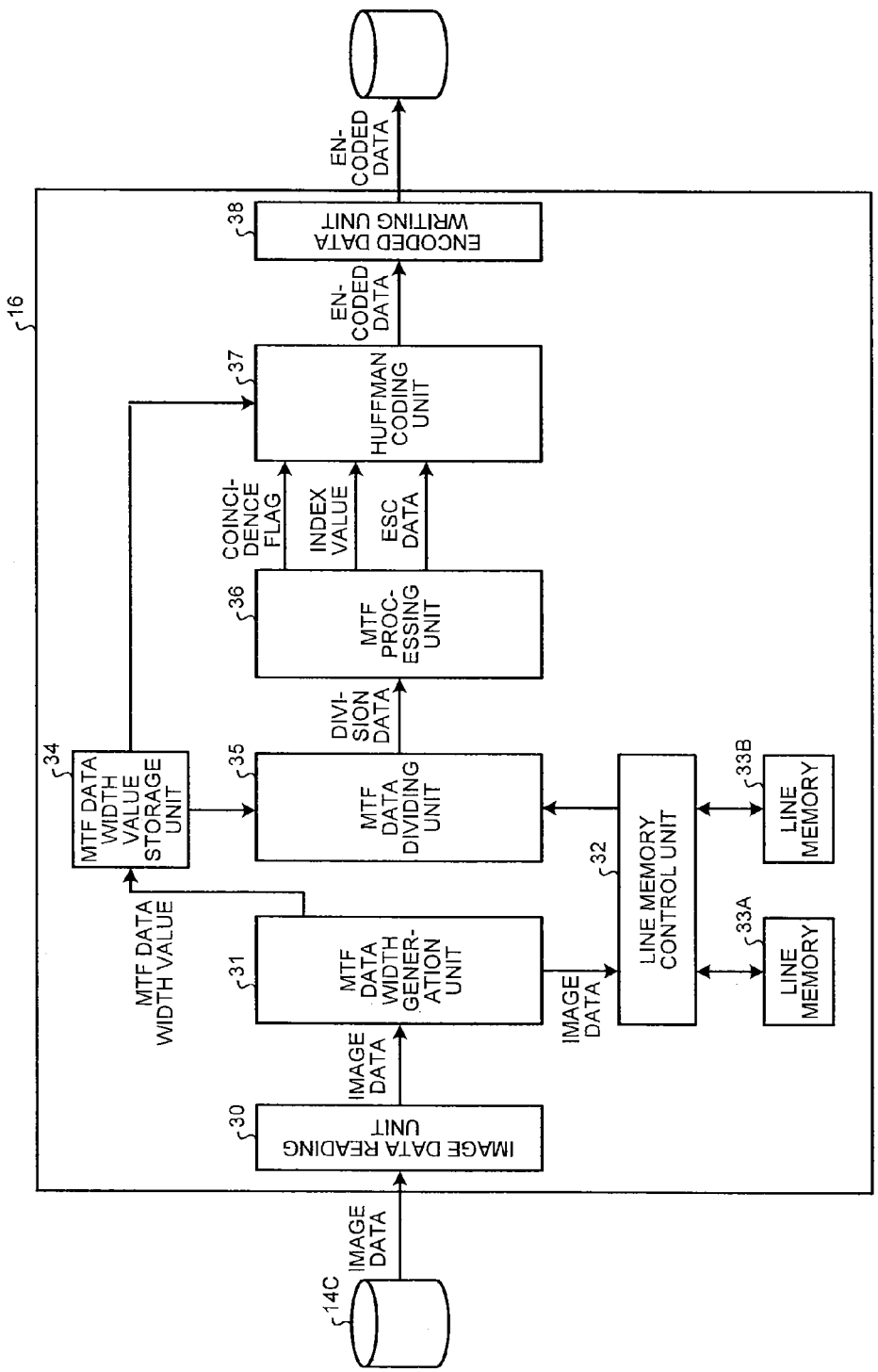
FIG. 3 is a block diagram illustrating an exemplary structure of an encoding unit in the first embodiment.

FIG. 3 illustrates an exemplary structure of the encoding unit 16 in the first embodiment. The encoding unit 16 includes an image data reading unit 30, an MTF data width generation unit 31, a line memory control unit 32, line memories 33A and 33B, an MTF data width value storage unit 34, an MTF data dividing unit 35, an MTF processing unit 36, a Huffman coding unit 37, and an encoded data writing unit 38.

The image data reading unit 30 reads the image data from the CMYK band image data area 14C of the main memory 14 and transfers the read image data to the MTF data width generation unit 31. In the encoding unit 16, the image data is processed on the basis of a predetermined data length. The predetermined data length is called as a word. For example, 1 word has a data length of 64 bits. For example, the image data reading unit 30 reads the image data from the CMYK band image data area 14C word by word (also referred to as in word units).

Figure 4:
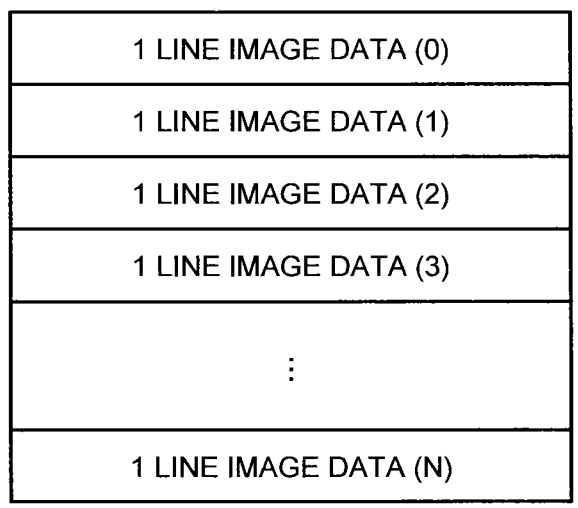
FIG. 4 is a schematic diagram illustrating an exemplary structure of image date read by an image data reading unit.

FIG. 4 illustrates an exemplary structure of the image data read by the image data reading unit 30 from the CMYK band image data area 14C. In the CMYK band image data area 14C, the image data of one line for forming an image by one time main-scanning is stored at a level of the image data of lines the number of which (N) corresponds to the height of the band, for each of the color planes of CMYK. The image data reading unit 30 sequentially reads the image data in word units and line by line (also referred to as in line units) from the CMYK band image data area 14C.

The MTF data width generation unit 31 transmits the image data received from the image data reading unit 30 to the line memory control unit 32 while performing detection of different predetermined periods in parallel on the received image data. The period of the image data is a period of a bit value included in a bit string when the image data is represented by the bit string, for example. The MTF data width generation unit 31 determines an MTF data width value that is the data width used in the MTF control, on the basis of the detected periods, out of the data widths of the detected periods. The determined MTF data width value is stored in the MTF data width value storage unit 34 composed of registers, for example.

The line memory control unit 32 controls access to the line memories 33A and 33B, each of which stores therein the image data in line units. The line memory control unit 32 writes the image data received from the MTF data width generation unit 31 into one of the line memories 33A and 33B (in this case, in the line memory 33A). When the image data of one line is stored in the line memory 33A to which the line memory control unit 32 has written the image data, the line memory control unit 32 starts reading the image data from the line memory 33A and also writes the next image data received from the MTF data width generation unit 31 into the line memory 33B. In this way, the line memory control unit 32 switches the writing destination and reading origin of the image data between the line memories 33A and 33B in a toggle manner (alternately) in line units.

The MTF data dividing unit 35 receives the image data from the line memory control unit 32 and divides the received image data on the basis of the MTF data width value stored in the MTF data width value storage unit 34. For example, when the MTF data width value stored in the MTF data width value storage unit 34 indicates 32 bits, the MTF data dividing unit 35 divides the image data received from the line memory control unit 32 in word units into pieces of division data each having a data width of 32 bits. The division data is sequentially transferred to the MTF processing unit 36.

Upon receiving the division data from the MTF data dividing unit 35, the MTF processing unit 36 compares a dictionary included in the MTF processing unit 36 with the received division data on the basis of a move to front (MTF) algorithm, and determines whether the data coincident with the division data is present in the dictionary. When it is determined that the dictionary data coincident with the division data is present, the MTF processing unit 36 obtains an index value of the dictionary data, and thereafter moves the dictionary data to the head of the dictionary and shifts the dictionary data already registered in the dictionary toward the back end side of the dictionary data by data. On the other hand, when it is determined that no dictionary data coincident with the division data is present, the MTF processing unit 36 determines the division data as escape (ESC) data. The index value and the ESC data are transferred to the Huffman coding unit 37 together with a coincidence flag that indicates whether the dictionary data coincident with the division data is present in the dictionary.

Figure 5A:
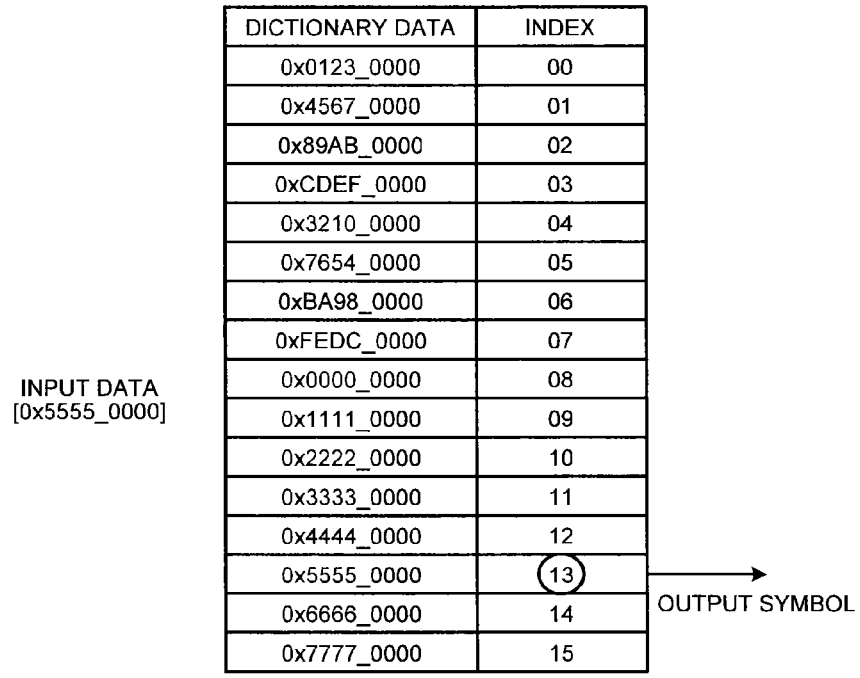
FIGS. 5A and 5B are schematic diagrams to roughly explain move to front (MTF) processing.
Figure 5B:
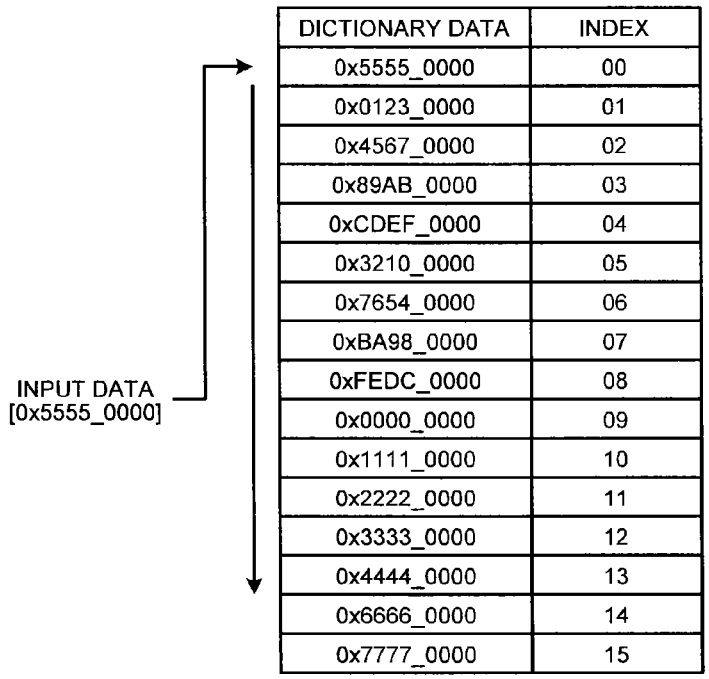

The MTF process is roughly described with reference to FIGS. 5A and 5B. Overall, in the MTF process as exemplarily illustrated in FIG. 5A, a dictionary storing a plurality of pieces of dictionary data is prepared and the index values are sequentially allocated to the pieces of dictionary data from the head of the storage positions of the pieces of dictionary data. In the example of FIG. 5A, an index value of "00" (INDEX00), which is the smallest value, is allocated to the head position, and the index values are allocated in such a manner that the index value is incremented as the stored position proceeds to the back end of the dictionary, i.e., an index value of "01", an index value of "02", . . . , and an index value of "15" are allocated.

Then, the MTF processing unit 36 compares the input data with the dictionary date included in the dictionary and determines whether the dictionary data coincident with the input data is present. When the dictionary data coincident with the input data is present, the MTF processing unit 36 outputs the index value allocated to the dictionary data coincident with the input data as an output symbol (code name), and thereafter updates the dictionary by moving the dictionary data to the head of the dictionary as exemplarily illustrated in FIG. 5B. In addition, the MTF processing unit 36 sets the coincidence flag to a value indicating the coincidence (e.g., a value of "1").

On the other hand, when no dictionary data coincident with the input data is present, the MTF processing unit 36 outputs the ESC data in which a code name of "ESC" is added to the input data. In addition, the MTF processing unit 36 sets the coincidence flag to a value indicating the non-coincidence (e.g., a value of "0").

The Huffman coding unit 37 performs variable-length coding on the index value, the ESC data, and the coincidence flag that are received from the MTF processing unit 36 with reference to a predetermined table. The encoded data is transferred to the encoded data writing unit 38.

The Huffman coding process performed by the Huffman coding unit 37 is roughly described below. FIG. 6 illustrates an exemplary format of codes used in the Huffman coding unit 37. In FIG. 6, "0b" indicates that succeeding numeral values are represented in a binary manner.

The codes illustrated in FIG. 6 are variable-length Huffman codes and are allocated in such a manner that a shorter code is allocated to the code having a higher frequency of appearance in a Huffman tree. In the example of FIG. 6, the codes in the code table correspond to the respective code names and the respective code size tables. As for the code names, "ESC" indicating the ESC data, "INDEXnn" (nn represents "00" to "15") indicating the respective index values, a line header added to the head of the encoded data of one line, and a code end indicating the end of the code are defined.

The codes having a data length of 3 bits, which is the smallest size, are allocated to index values of "00" to "02", which are positioned on the head side in the dictionary. The code having a longer data length is allocated as the index value increases. As for each ESC data, the code having a data length corresponding to the corresponding one of the MTF data width values determined by the MTF data width generation unit 31 is added to a code of "000" indicating the ESC data. Each line header has a data length of 7 bits, which is the fixed value. As for each line header, the value corresponding to one of the MTF data width values determined by the MTF data width generation unit 31 is added to a code of "1111" indicating the line header. The code end has a data length of 5 bits and is fixed as a code of "11111".

A code of "000" indicating the ESC data can be considered as the code of the coincidence flag indicating the non-coincidence. In this case, whether the presence of a code of "000" can be used as the value of the coincidence flag, for example. Alternatively, a code indicating the coincidence flag may be defined.

The Huffman coding unit 37 searches the values in the code table of FIG. 6 using the index value and the ESC data output from the MTF processing unit 36 as the code names and outputs the searching results as the encoded data.

The encoded data writing unit 38 adds header information to the encoded data received from the Huffman coding unit 37 in accordance with a predetermined format. The encoded data writing unit 38 writes the encoded data to which the header information has been added into the CMYK page code data area 14D in the main memory 14.

Figure 7:
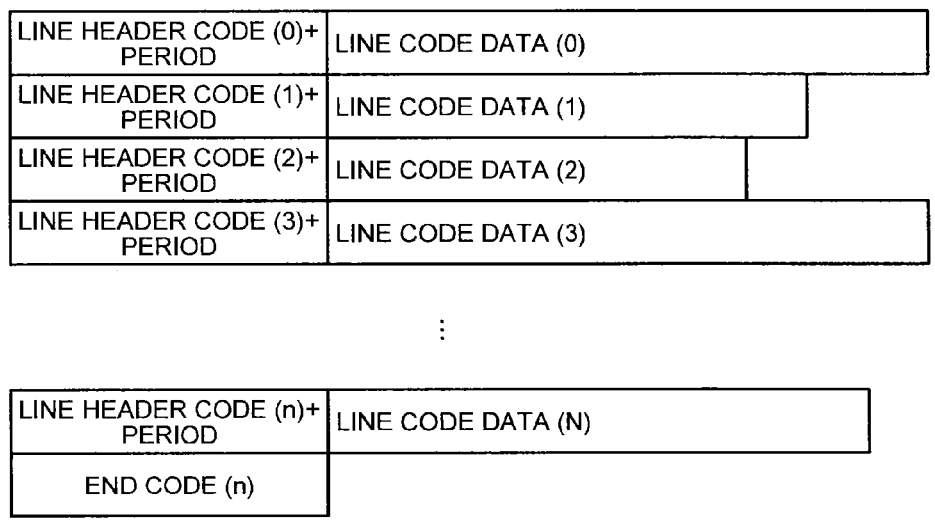
FIG. 7 is a schematic diagram illustrating an exemplary format of encoded data output from an encoded data writing unit.

FIG. 7 illustrates an exemplary format of encoded data output from the encoded data writing unit 38. The image data represented by the ESC data and the index value in each of the lines (0) to (N) is variable-length encoded by the Huffman coding as described with reference to FIG. 6. As a result, line code data (0) to (N) is output. Line header codes are added to the respective heads of the line code data (0) to (N). As described with reference to FIG. 6, the line header code includes the information indicating the period of the line. An end code (n) is added behind the line code data (N), which is the last line code data, and indicates the end of the code.

Details of the Units of the Encoding Unit

Figure 8:
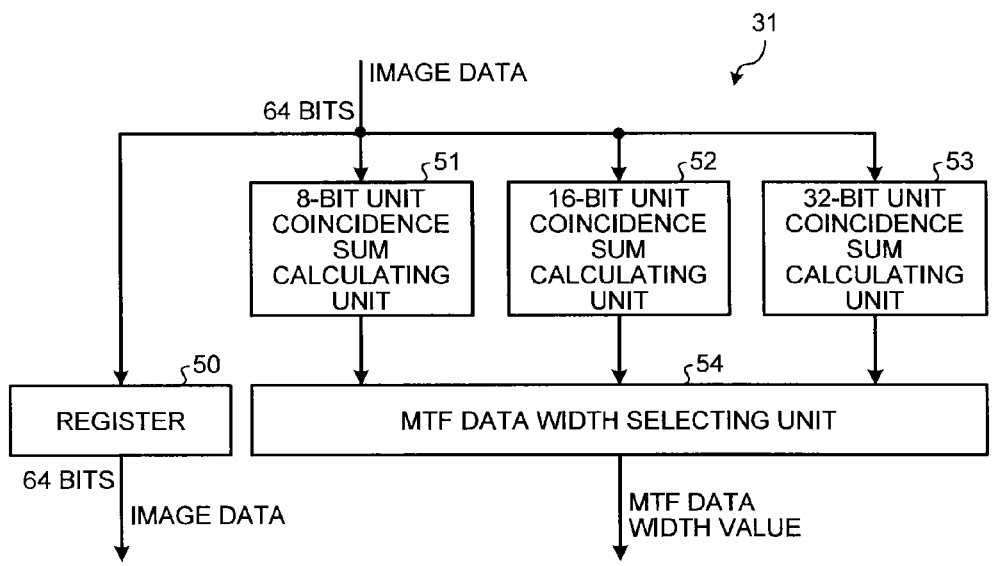
FIG. 8 is a block diagram illustrating an exemplary structure of an MTF data width generation unit.

Each unit of the encoding unit 16 is described in more detail below. The MTF data width generation unit 31 is described below. FIG. 8 illustrates an exemplary structure of the MTF data width generation unit 31. As described above, the MTF data width generation unit 31 obtains the period in one line of the input image data. In the first embodiment, the MTF data width generation unit 31 detects in parallel a predetermined plurality of periods. The MTF data width generation unit 31 selects the longest period in the detected periods and determines the data length corresponding to the selected period as the data width (called as an MTF data width) used in the MTF process.

In the example of FIG. 8, the MTF data width generation unit 31 has an 8-bit unit coincidence sum calculating unit 51, a 16-bit unit coincidence sum calculating unit 52, and a 32-bit unit coincidence sum calculating unit 53, and can detect three types of periods of 8 bits, 16 bits, and 32 bits with respect to the input image data.

The image data transferred from the image data reading unit 30 in word units is received by the MTF data width generation unit 31, and is temporarily stored in a register 50 and in parallel is input to the 8-bit unit coincidence sum calculating unit 51, the 16-bit unit coincidence sum calculating unit 52, and the 32-bit unit coincidence sum calculating unit 53.

The 8-bit unit coincidence sum calculating unit 51 counts the number of coincident bits in 8-bit units in the image data input in word units, sums up the number of coincident bits counted in 8-bit units for one line, and outputs the result. Likewise, the 16-bit unit coincidence sum calculating unit 52 counts the number of coincident bits in 16-bit units in the image data input in word units, sums up the number of coincident bits counted in 16-bit units for one line, and outputs the result. The 32-bit unit coincidence sum calculating unit 53 also counts the number of coincident bits in 32-bit units in the image data input in word units, sums up the number of coincident bits counted in 32-bit units for one line, and outputs the result.

Figure 9:
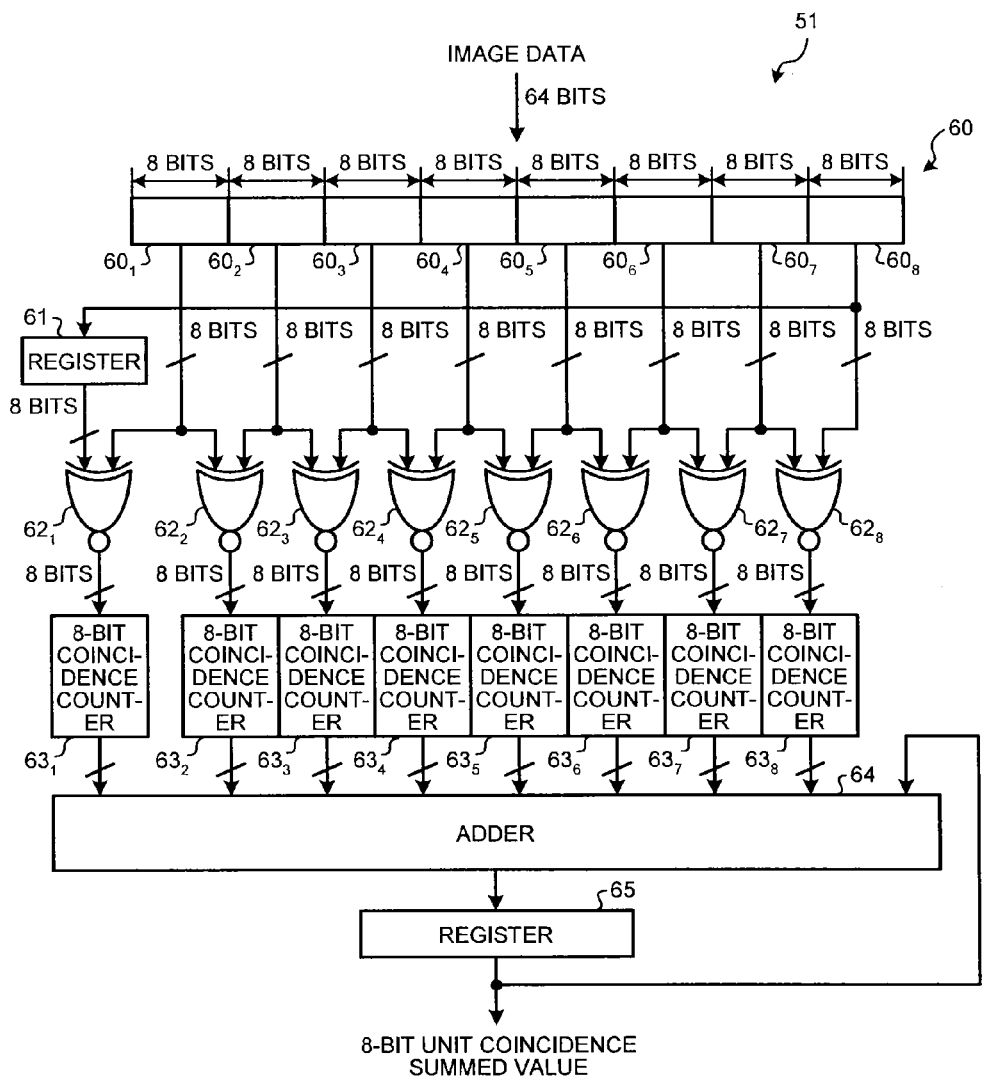
FIG. 9 is a block diagram illustrating an exemplary structure of an 8-bit unit coincidence sum calculating unit.

FIG. 9 illustrates an exemplary structure of the 8-bit unit coincidence sum calculating unit 51. The image data of one word is stored in a register 60 that stores therein the data in 8-bit units. For example, 8 bits on the least significant bit (LSB) side of the image data of one word are stored in an area $60_1$ of the register 60 and succeeding 8 bits are stored in an area $60_2$. Likewise, the image data is stored in areas $60_3$, $60_4$, ..., and $60_8$ every 8 bits. In a register 61, 8 bits on the most significant bit (MSB) side of the image data of previous one word are stored.

Each of exclusive OR (XOR) circuits $62_1$ to $62_8$ detects the coincident bits between two pieces of data input in 8-bit units by performing exclusive OR operation between every corresponding bits of the two pieces of data and outputting the reversal value of the operation result. Two pieces of data read in 8-bit units from respective two areas adjacent to each other in areas $60_1$ to $60_8$ are input to the respective XOR circuits $62_2$ to $62_8$, by which the coincident bits are detected in 8-bit units. In addition, two pieces of data read in 8-bit units from the area $60_1$ and the register 61 are input to the XOR circuit $62_1$, by which the coincident bits are detected in 8-bit units.

Figures 10, 11:
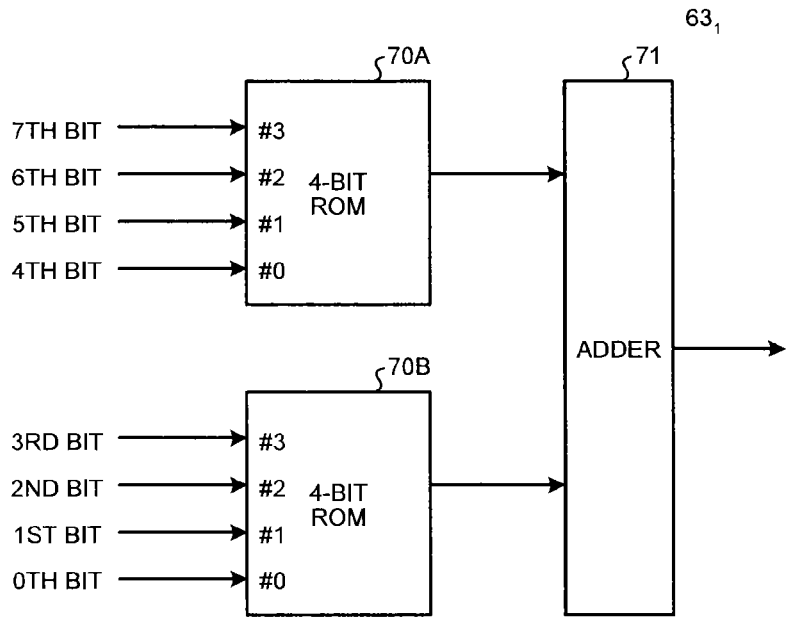
FIG. 10 is a block diagram illustrating an exemplary structure of an 8-bit coincidence counter.
FIG. 11 is a schematic diagram illustrating an exemplary structure of a 4-bit ROM.

The outputs of the XOR circuits $62_1$ to $62_8$ are input to respective 8-bit coincidence counters $63_1$ to $63_8$, by which the numbers of coincident bits are counted. FIG. 10 illustrates a structure of the 8-bit coincidence counter $63_1$ as the representative exemplary structure of the 8-bit coincidence counters $63_1$ to $63_8$. The 8-bit coincidence counter $63_1$ has 4-bit ROMs 70A and 70B each of which preliminarily stores therein 4-bit values, and an adder 71.

Each of the 4-bit ROMs 70A and 70B preliminarily stores therein the numbers illustrated in FIG. 11 as output values. In FIG. 11, the addresses have respective values represented by 4 bits and each output value is the number of numerals, which numeral is "1", included in the value of the corresponding address. The upper 4 bits (the fourth bit to the seventh bit) of the 8-bit data output from the XOR circuit $62_1$ are input to respective input terminals #0 to #3 of the 4-bit ROM 70A while the lower 4 bits (the zero bit to the third bit) of the 8-bit data are input to respective input terminals #0 to #3 of the 4-bit ROM 70B. Each of the 4-bit ROMs 70A and 70B outputs the output value corresponding to the address based on 4 bits input therein. The outputs of the 4-bit ROMs 70A and 70B are added by the adder 71, which outputs the result.

The outputs of the 8-bit coincidence counters $63_1$ to $63_8$ are input to an adder 64, which calculates the sum. The summed value is stored in a register 65 as an 8-bit unit coincidence summed value. The 8-bit unit coincidence summed value read from the register 65 is input to the adder 64, and added to the outputs of the 8-bit coincidence counters $63_1$ to $63_8$ of the next word. That is, the 8-bit unit coincidence summed values of the respective words are accumulated. In this way, the 8-bit unit coincidence summed value of one word is sequentially accumulated. As a result, the 8-bit unit coincidence summed value of one line is obtained. After the completion of the processing of one line, the 8-bit unit coincidence summed value of one line is read from the register 65 and input to an MTF data width selecting unit 54.

Figure 12:
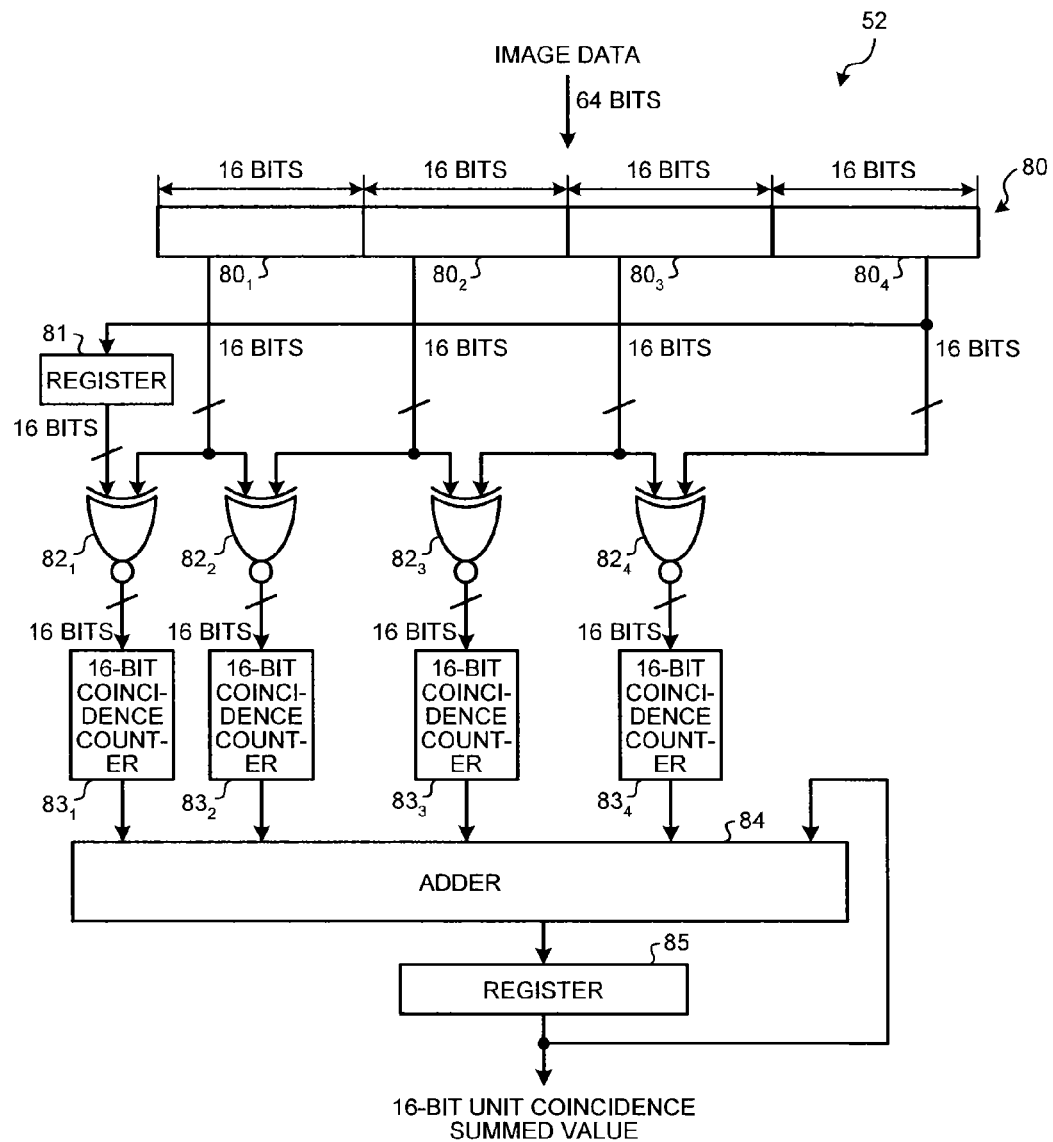
FIG. 12 is a block diagram illustrating an exemplary structure of a 16-bit unit coincidence sum calculating unit.

FIG. 12 illustrates an exemplary structure of the 16-bit unit coincidence sum calculating unit 52. The structure of the 16-bit unit coincidence sum calculating unit 52 is basically the same as that of the 8-bit unit coincidence sum calculating unit 51. The image data of one word is stored in a register 80 that stores therein the data in 16-bit units. For example, 16 bits on the LSB side of the image data of one word are stored in an area $80_1$ of the register 80. Likewise, the image data is sequentially stored in areas $80_2$, $80_3$, and $80_4$ every 16 bits. In a register 81, 16 bits on the MSB side of the image data of previous one word are stored.

Each of XOR circuits $82_1$ to $82_4$ detects the coincident bits between two pieces of data input in 16-bit units by performing exclusive OR operation between every corresponding bits of the two pieces of data and outputting the reversal value of the operation result. Two pieces of data read in 16-bit units from respective two areas adjacent to each other in areas $80_1$ to $80_4$ are input to the respective XOR circuits $82_2$ to $82_4$, by which the coincident bits are detected in 16-bit units. In addition, two pieces of data read in 16-bit units from the area $80_1$ and the register 81 are input to the XOR circuit $82_1$, by which the coincident bits are detected in 16-bit units.

The outputs of the XOR circuits $82_1$ to $82_4$ are input to respective 16-bit coincidence counters $83_1$ to $83_4$, by which the numbers of coincident bits are counted. The structure of each of the 16-bit coincidence counters $83_1$ to $83_4$ can be achieved by adding the 4-bit ROMs to the structure of the 8-bit coincidence counters $63_1$ described with reference to FIGS. 10 and 11, and thus the description thereof is omitted.

The outputs of the 16-bit coincidence counters $83_1$ to $83_4$ are input to an adder 84, which calculates the sum. The summed value is stored in a register 85 as a 16-bit unit coincidence summed value. The 16-bit unit coincidence summed value read from the register 85 is input to the adder 84, and added to the outputs of the 16-bit coincidence counters $83_1$ to $83_4$ of the next word. That is, the 16-bit unit coincidence summed values of the respective words are accumulated. The 16-bit unit coincidence summed value of one line, which is obtained by sequentially accumulating the 16-bit unit coincidence summed value of one word, is read from the register 85 and input to the MTF data width selecting unit 54.

Figure 13:
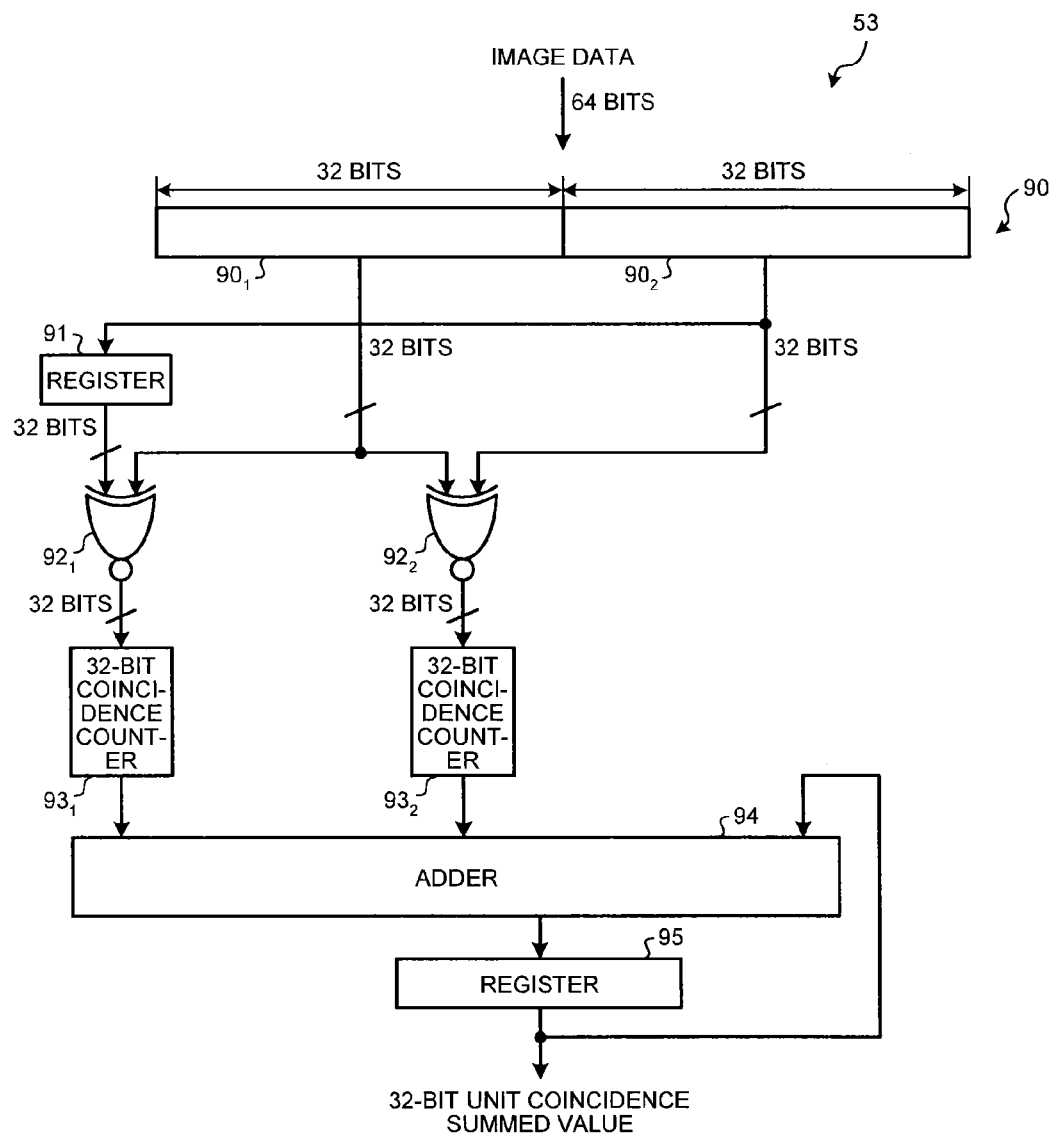
FIG. 13 is a block diagram illustrating an exemplary structure of a 32-bit unit coincidence sum calculating unit.

FIG. 13 illustrates an exemplary structure of the 32-bit unit coincidence sum calculating unit 53. The structure of the 32-bit unit coincidence sum calculating unit 53 is also basically the same as that of the 8-bit unit coincidence sum calculating unit 51. The image data of one word is stored in a register 90 that stores therein the data in 32-bit units. For example, 32 bits on the LSB side of the image data of one word and 32 bits on the MSB side of the image data are stored in areas $90_1$ and $90_2$ of the register 90, respectively. In a register 91, 32 bits on the MSB side of the image data of previous one word are stored.

Each of XOR circuits $92_1$ and $92_2$ detects the coincident bits between two pieces of data input in 32-bit units by performing exclusive OR operation between every corresponding bits of the two pieces of data and outputting the reversal value of the operation result. The image data of 32 bits read from the register 91 is input to the XOR circuit $92_1$. The image data of 32 bits read from the area $90_1$ of the register 90 is input to the XOR circuits $92_1$ and $92_2$. The image data of 32 bits read from the area $90_2$ is input to the XOR circuit $92_2$. The XOR circuits $92_1$ and $92_2$ detect the coincident bits in 32-bit units in the image data read from the register 91 and the areas $90_1$ and $90_2$ in 32-bit units.

The outputs of the XOR circuits $92_1$ and $92_2$ are input to respective 32-bit coincidence counters $93_1$ and $93_2$, by which the numbers of coincident bits are counted. The structure of each of the 32-bit coincidence counters $93_1$ and $93_2$ can be achieved by adding the 4-bit ROMs to the structure of the 8-bit coincidence counters $63_1$ described with reference to FIGS. 10 and 11, and thus the description thereof is omitted.

The outputs of the 32-bit coincidence counters $93_1$ and $93_2$ are input to an adder 94, which calculates the sum. The summed value is stored in a register 95 as a 32-bit unit coincidence summed value. The 32-bit unit coincidence summed value read from the register 95 is input to the adder 94, and added to the outputs of the 32-bit coincidence counters $93_1$ and $93_2$ of the next word. That is, the 32-bit unit coincidence summed values of the respective words are accumulated. The 32-bit unit coincidence summed value of one line, which is obtained by sequentially accumulating the 32-bit unit coincidence summed value of one word, is read from the register 95 and input to the MTF data width selecting unit 54.

In the first embodiment, the processing in the 8-bit unit coincidence sum calculating unit 51, the 16-bit unit coincidence sum calculating unit 52, and the 32-bit unit coincidence sum calculating unit 53 is performed in parallel.

For example, a common clock is supplied to the 8-bit unit coincidence sum calculating unit 51, the 16-bit unit coinci-dence sum calculating unit 52, and the 32-bit unit coincidence sum calculating unit 53. The calculating units 51, 52, and 53 have the same structure composed of the stages, which are the register, the XOR circuit, the coincidence counter, the adder, and the output register. This structure enables input operation timing of the image data to the calculating units 51, 52, and 53 and the output operation timing of the coincidence summed values from the calculating units 51, 52, and 53 to be synchronized by operating the calculating units 51, 52, and 53 with the same clock, thereby enabling the processing in the calculating units 51, 52, and 53 to be performed in parallel.

Referring back to FIG. 8, the MTF data width selecting unit 54 receives the coincidence summed values of one line in the respective bit units, i.e., 8-bit unit, 16-bit unit, and 32-bit unit, from the 8-bit unit coincidence sum calculating unit 51, the 16-bit unit coincidence sum calculating unit 52, and the 32-bit unit coincidence sum calculating unit 53. The MTF data width selecting unit 54 selects a maximum coincidence summed value in the 8-bit unit, 16-bit unit, and 32-bit unit coincidence summed values and determines the value indicating the bit unit of the selected coincidence summed value as the MTF data width value. For example, when the 16-bit coincidence summed value is the maximum in the 8-bit unit, 16-bit unit, and 32-bit unit coincidence summed values, the MTF data width selecting unit 54 determines the MTF data width value to 16 bits.

The MTF data width generation unit 31 transfers the MTF data width value indicating the value of the MTF data width determined by the MTF data width selecting unit 54 to the MTF data width value storage unit 34 and causes the MTF data width value storage unit 34 to store therein the MTF data width value. Meanwhile, the MTF data width generation unit 31 transfers the image data stored in the register 50 to the line memory control unit 32.

Figure 14:
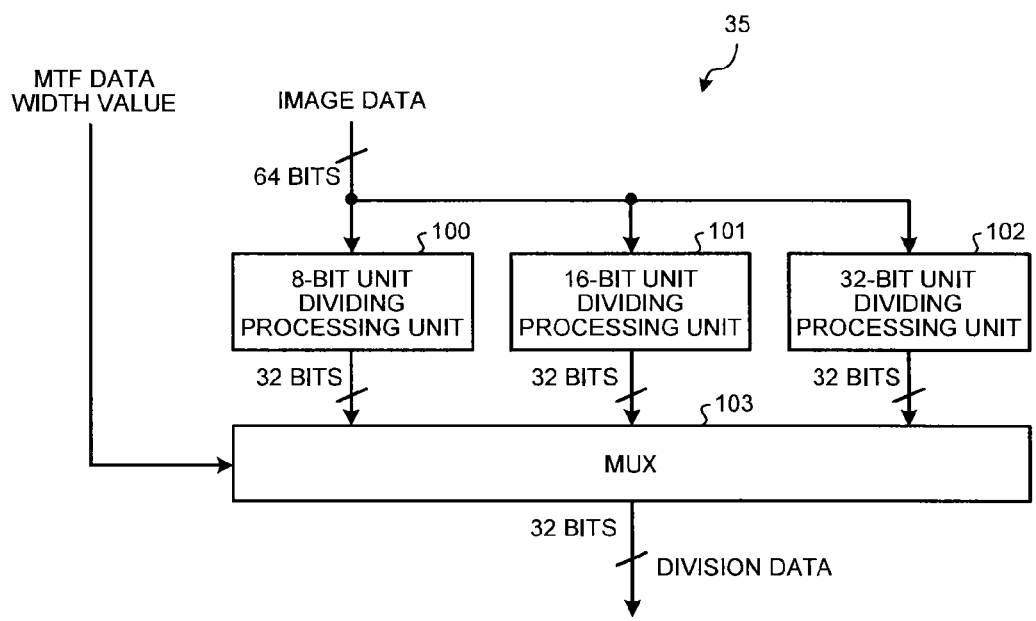
FIG. 14 is a block diagram illustrating an exemplary structure of an MTF data dividing unit.

The MTF data dividing unit 35 is described below. FIG. 14 illustrates an exemplary structure of the MTF data dividing unit 35. The MTF data dividing unit 35 divides the image data into pieces of division data by the MTF data width determined by the MTF data width generation unit 31 described as above, and transfers the division data obtained by dividing the image data to the MTF processing unit 36.

The MTF data dividing unit 35 has a plurality of dividing processing units that divide the image data into pieces of division data by different units corresponding to a plurality of periods detected by the MTF data width generation unit 31. In this case, the MTF data dividing unit 35 has three dividing units, which are an 8-bit unit dividing processing unit 100, a 16-bit unit dividing processing unit 101, and a 32-bit unit dividing processing unit 102, as illustrated in FIG. 14 because the MTF data width generation unit 31 performs detection of three periods in 8-bit, 16-bit, and 32-bit units.

The 8-bit unit dividing processing unit 100, the 16-bit unit dividing processing unit 101, and the 32-bit unit dividing processing unit 102 divide the input image data into pieces of data by the respective predetermined units. The dividing processing units 100, 101, and 102 form the pieces of division data such that the data width of the division data equals to the data width corresponding to the maximum period in the period detection by the MTF data width generation unit 31. For example, when the data width corresponding to the maximum period in the period detection is 32 bits and the data width of the division data is 16 bits, data having a data width of 16 bits and all bits of "0" is added on the LSB side of the division data. As a result, the data having a data width of 32 bits is formed.

The image data received from the line memory control unit 32 in word units is input to the 8-bit unit dividing processing unit 100, the 16-bit unit dividing processing unit 101, and the 32-bit unit dividing processing unit 102. The 8-bit unit dividing processing unit 100, the 16-bit unit dividing processing unit 101, and the 32-bit unit dividing processing unit 102 divide the input image data into pieces of data in the respective 8-bit, 16-bit, and 32-bit units, form the pieces of division data so as to have a data width of 32 bits, and output the formed data as the division data.

Figure 15:
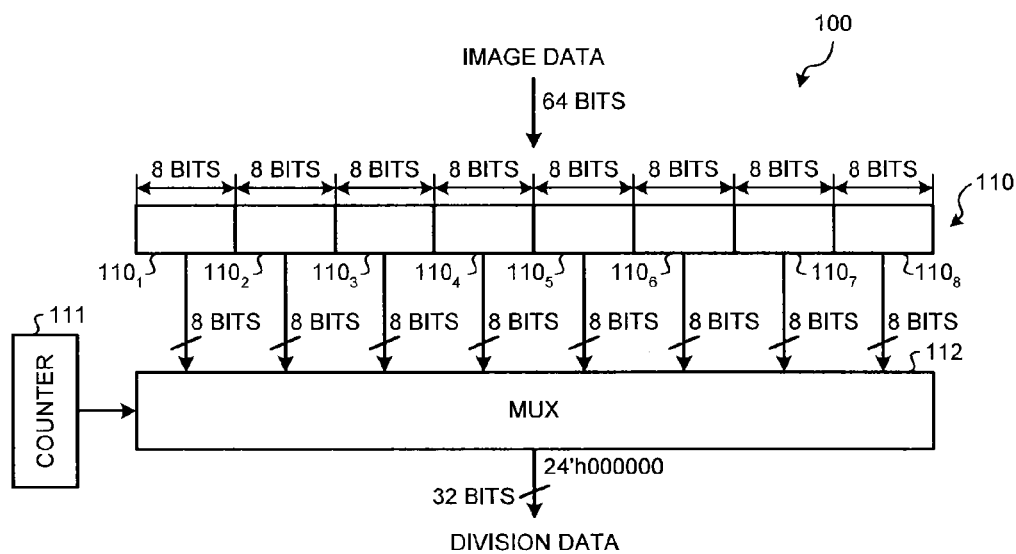
FIG. 15 is a block diagram illustrating an exemplary structure of an 8-bit unit dividing processing unit.

FIG. 15 illustrates an exemplary structure of the 8-bit unit dividing processing unit 100. The image data of one word is stored in a register 110 that stores therein the data in 8-bit units. For example, 8 bits on the LSB side of the image data of one word are stored in an area $110_1$ of the register 110, succeeding 8 bits are stored in an area $110_2$. Likewise, the image data is stored in areas $110_3, 110_4, \ldots,$ and $110_8$ every 8 bits.

The image data read from the areas $110_1$ to $110_8$ of the register 110 in 8-bit units is input to a multiplexer (MUX) 112. The MUX 112 receives count values produced by a counter 111 at certain operation timing intervals. The MUX 112 sequentially selects the image data read from the areas $110_1$ to $110_8$ in 8-bit units in accordance with the count values input from the counter 111. The MUX 112 adds 24 bits of "0" to the LSB of the selected image data of 8 bits and outputs the resultant data as the division data having a data width of 32 bits.

Figure 16:
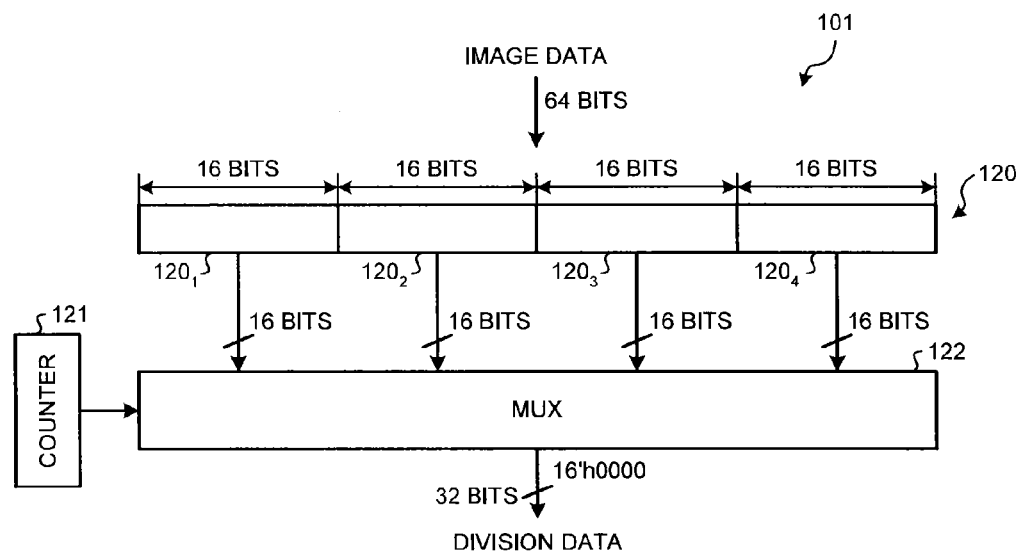
FIG. 16 is a block diagram illustrating an exemplary structure of a 16-bit unit dividing processing unit.

FIG. 16 illustrates an exemplary structure of the 16-bit unit dividing processing unit 101. The image data of one word is stored in a register 120 that stores therein the data in 16-bit units. For example, 16 bits on the LSB side of the image data of one word are stored in an area $120_1$ of the register 120, succeeding 16 bits are stored in an area $120_2$, following 16 bits are stored in areas $120_3$, and 16 bits on the MSB side are stored in an area $120_4$.

The image data read from the areas $120_1$ to $120_4$ of the register 120 in 16-bit units is input to an MUX 122. The MUX 122 receives count values produced by a counter 121 at certain operation timing intervals. The MUX 122 sequentially selects the image data read from the areas $120_1$ to $120_4$ in 16-bit units in accordance with the count values input from the counter 121. The MUX 122 adds 16 bits of "0" to the LSB of the selected image data of 16 bits and outputs the resultant data as the division data having a data width of 32 bits.

Figure 17:
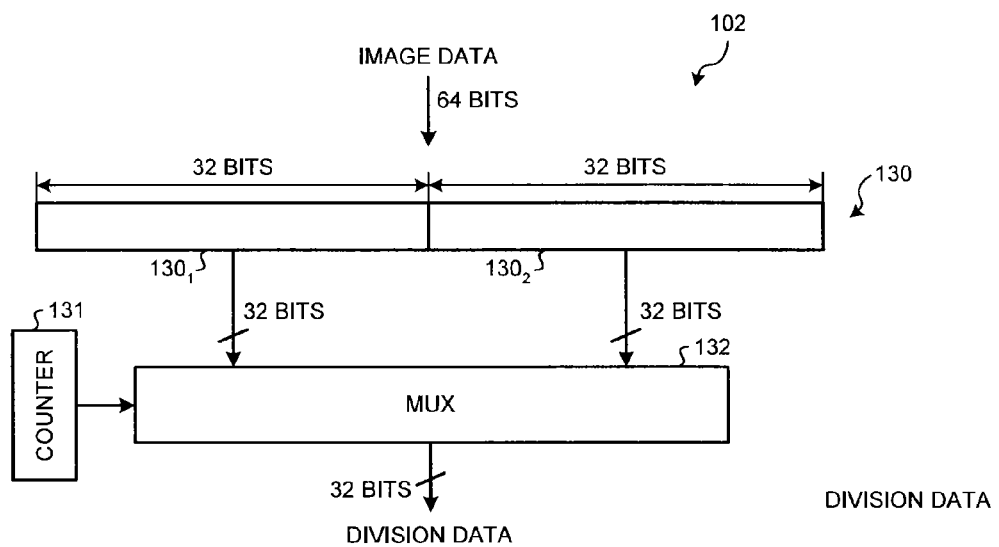
FIG. 17 is a block diagram illustrating an exemplary structure of a 32-bit unit dividing processing unit.

FIG. 17 illustrates an exemplary structure of the 32-bit unit dividing processing unit 102. The image data of one word is stored in a register 130 that stores therein the data in 32-bit units. For example, 32 bits on the LSB side of the image data of one word are stored in an area $130_1$ of the register 130, and 32 bits on the MSB side are stored in areas $130_2$.

The image data read from the areas $130_1$ and $130_2$ of the register 130 in 32-bit units is input to an MUX 132. The MUX 132 receives count values produced by a counter 131 at certain operation timing intervals. The MUX 132 sequentially selects the image data read from the areas $130_1$ and $130_2$ in 32-bit units in accordance with the count values input from the counter 131 and outputs the selected image data as the division data having a data width of 32 bits.

Referring back to FIG. 14, the division data output from the 8-bit unit dividing processing unit 100, the 16-bit unit dividing processing unit 101, and the 32-bit unit dividing processing unit 102 is input to an MUX 103. In addition, the MTF data width value read from the MTF data width value storage unit 34 is input to the MUX 103. The MUX 103 selects the output corresponding to the input MTF data width value out of the outputs of the 8-bit unit dividing processing unit 100, the 16-bit unit dividing processing unit 101, and the 32-bit unit dividing processing unit 102, and transfers the selected output to the MTF processing unit 36.

The MTF processing unit 36 is described below. As described with reference to FIGS. 5A and 5B, in the MTF process, input data and the dictionary data are compared with each other, and when the dictionary data coincident with the input data is included in the dictionary, the coincidence flag having the value indicating the coincidence and the index value corresponding to the storage position of the dictionary data in the dictionary are output, and thereafter the dictionary is updated by moving the dictionary data to the head of the dictionary.

Figure 18:
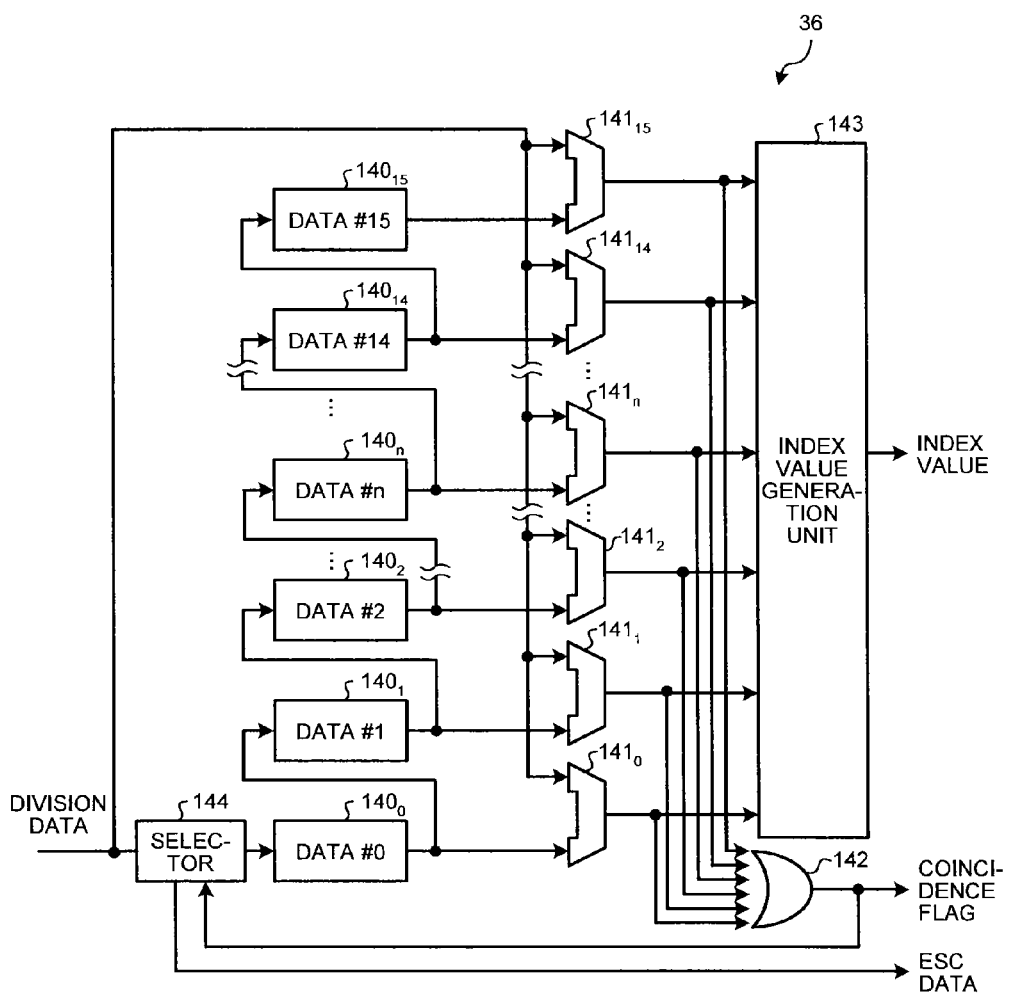
FIG. 18 is a block diagram illustrating an exemplary structure of an MTF processing unit.

FIG. 18 illustrates an exemplary structure of the MTF processing unit 36 to perform such processing. The MTF processing unit 36 has a plurality of registers $140_0, 140_1, \ldots, 140_n, \ldots,$ and $140_{15}$ that store therein dictionary data, a plurality of comparators $141_0, 141_1, \ldots, 141_n, \ldots,$ and $141_{15}$ that compare the dictionary data with the input data, a coincidence detecting unit 142 that detects the coincidence between the dictionary data and the input data, an index value generation unit 143 that produces the index values, and a selector 144 that switches paths of the input data in accordance with the output of the coincidence detecting unit 142, for example.

The registers $140_0$ to $140_{15}$ constitute the dictionary used in the MTF process. For example, dictionary data #0, which is positioned at the head of the dictionary, is stored in the register $140_0$ and succeeding dictionary data #1 is stored in the register $140_1$. Likewise, pieces of dictionary data #2 to #15 are sequentially stored in the respective registers $140_2$ to $140_{15}$ toward the back end side of the dictionary. The input and output of each of the registers $140_0$ to $140_{15}$ are connected such that the output of a certain register is connected the input of the next adjacent register, thereby enabling the dictionary data to be shifted when the dictionary is updated.

As described above, in the first embodiment, the size of the dictionary (the data length of the dictionary data included in the dictionary) corresponds to the maximum period detectable by the MTF data width generation unit 31. In the first embodiment, the MTF data width generation unit 31 detects the periods corresponding to the three types of data length, which are 8 bits, 16 bits, and 32 bits. Accordingly, the size of the dictionary is 32 bits, which is the maximum in three types of period.

The image data is divided by the MTF data dividing unit 35 into pieces of division data by the MTF data width value produced by the MTF data width generation unit 31, and is input to the MTF processing unit 36 as the input data and compared with the dictionary data. As for the dictionary data having the data length corresponding to the period that is not the maximum period to be detected by the MTF data width generation unit 31, a predetermined value (e.g., a value of "0") is added to the LSB side of the data having the data length corresponding to the period detected by the MTF data width generation unit 31 in such a manner that the data length becomes the date length corresponding to the maximum period as described above.

More specifically, when the data having a data length corresponding to the period of 16-bit detected by the MTF data width generation unit 31, for example, the data is formed as the dictionary data by adding 16 bits of "0" on the LSB side to the data of 16 bits on the MSB side of the data as exemplarily illustrated in FIG. 19A. The input data having a data length of 16 bits (e.g., a value of "0x5555") is changed to the data having a data length of 32 bits (in this case, a value of "0x5555_0000") by adding a value of "0x0000" on the LSB side of the input data, and used for searching the dictionary.

As a result, the searching of the dictionary can be performed without difficulty because a value of "0x0000" is added to the dictionary data on the LSB side thereof in the same manner as the input data.

In FIGS. 19A and 19B, "0x" indicates that succeeding numerals are represented in a hexadecimal manner.

FIG. 19B illustrates an example when the data has the data length corresponding to the period of 32 bits detected by the MTF data width generation unit 31. In this case, the input data is used for searching the dictionary without any change because the data length corresponding to the period is coincident with the size of the dictionary.

The outputs of the registers $140_0$ to $140_{15}$ are input to respective one input terminals of the comparators $141_0$ to $141_{15}$. The division data output from the MTF data dividing unit 35 is input to the MTF processing unit 36 as the input data, and input to respective the other input terminals of the comparators $141_0$ to $141_{15}$. Each of the comparators $141_1$ to $141_{15}$ compares the data input to one input terminal with the data input to the other input terminal. Each of the comparators $141_1$ to $141_{15}$ outputs a value of "1" indicating the coincidence when both data are coincident with each other while each of the comparators $141_1$ to $141_{15}$ outputs a value of "0" indicating the non-coincidence when both data are different from each other. The outputs of the comparators $141_0$ to $141_{15}$ are input to the coincidence detecting unit 142 and the index value generation unit 143.

The index value generation unit 143 associates the respective comparison results of the comparators $141_0$ to $141_{15}$ with index values of "00", "01", . . . , and "15" in this order. The index value generation unit 143 receives the comparison results of the comparators $141_0$ to $141_{15}$ and outputs the smallest index value out of the index values corresponding to the comparison results outputting the value indicating the coincidence. The index value is transferred to the Huffman coding unit 37.

The coincidence detecting unit 142, which has an OR circuit, performs logical OR operation on input values. When at least one of the comparison results of the comparators $141_0$ to $141_{15}$ is a value of "1" indicating the coincidence, the coincidence detecting unit 142 outputs the coincidence flag having a value of "1" indicating the coincidence to indicate that the dictionary data coincident with the input data is present. When all of the comparison results of the comparators $141_0$ to $141_{15}$ are values of "0" indicating the non-coincidence, the coincidence detecting unit 142 outputs the coincidence flag having a value of "0" indicating the non-coincidence. The coincidence flag is transferred to the Huffman coding unit 37.

The coincidence flag is also supplied to the selector 144. When the value of the coincidence flag is "1", which indicates that the dictionary data coincident with the input data is present, the selector 144 moves the dictionary data #0 to #14 stored in the registers $140_0$ to $140_{14}$, respectively, in such a manner that the dictionary data #0 is moved to the register $140_1$, the dictionary data #1 is moved to the register $140_2$, . . . , the dictionary data #14 is moved to the register $140_{15}$, and stores the input data in the register $140_0$.

On the other hand, when the value of the coincidence flag is "0", the selector 144 outputs the input data as the ESC data without any change. The ESC data is transferred to the Huffman coding unit 37.

The processing in the Huffman coding unit 37 is described below. The Huffman coding unit 37 receives the coincidence flag, the index value, and the ESC data output from the MTF processing unit 36, and the MTF data width value stored in the MTF data width value storage unit 34.

FIG. 20 is an exemplary flowchart illustrating overall processing in the Huffman coding unit 37. The Huffman coding unit 37 determines whether the data to be processed is the data at the head of the line at step S100. If it is determined that the data is not the data at the head of the line, the processing proceeds to step S102. On the other hand, if it is determined that data is the data at the head of the line, the processing proceeds to step S101, at which the Huffman coding unit 37 performs a line header encoding process, and thereafter the processing proceeds to step S102.

At step S102, the Huffman coding unit 37 determines whether the data to be processed is the data present in the dictionary on the basis of the coincidence flag received from the MTF processing unit 36. If the value of the coincidence flag is the value indicating the coincidence (e.g., a value of "1"), which indicates that the data to be processed is present in the dictionary, the processing proceeds to step S103, at which the Huffman coding unit 37 performs an index encoding process. On the other hand, if the value of the coincidence flag is the value indicating the non-coincidence (e.g., a value of "0"), which indicates that the data to be processed is not present in the dictionary, the processing proceeds to step S104, at which the Huffman coding unit 37 performs an ESC encoding process.

After the completion of the processing at step S103 or step S104, the processing proceeds to step S105, at which the Huffman coding unit 37 determines whether the data to be processed is the end of the last line. If it is determined that the data to be processed is the end of the last line, the processing proceeds to step S106, at which the Huffman coding unit 37 performs an end encoding process. Then, the processing returns to step S100, at which the Huffman coding unit 37 starts the processing of next data to be processed. The processing of the next data is omitted to be illustrated. On the other hand, if it is determined that the data to be processed is not the end of the last line at step S105, the processing returns to step S100.

Figure 21:
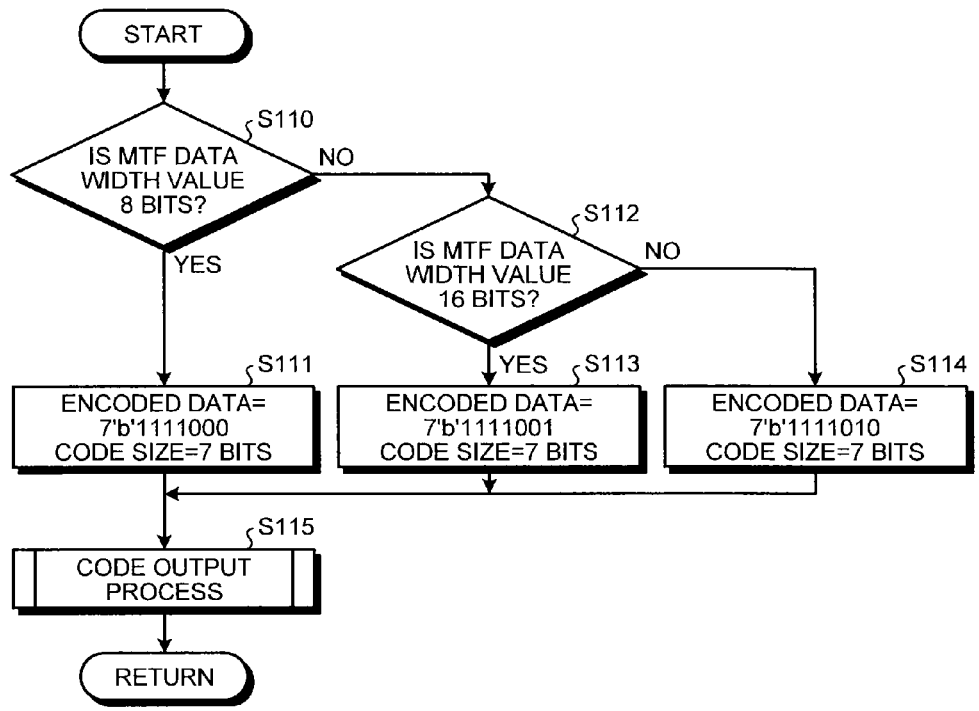
FIG. 21 is an exemplary flowchart illustrating a line header encoding process.

FIG. 21 is an exemplary flowchart illustrating the line header encoding process at step S101 of FIG. 20. In the line header encoding process, the line header code is selected on the basis of the MTF data width value in accordance with the format described with reference to FIG. 6. At step S110, the Huffman coding unit 37 determines whether the MTF data width value is 8 bits. If it is determined that the MTF data width value is 8 bits, the processing proceeds to step S111, at which the Huffman coding unit 37 sets the code data of the line header code to "7'b'1111000" and the code size to 7 bits. In the encoded data, "7'b'" indicates that succeeding numeral values of 7 bits are represented in a binary manner.

If it is determined that the MTF data width value is not 8 bits at step S110, the processing proceeds to step S112, at which the Huffman coding unit 37 determines whether the MTF data width value is 16 bits. If it is determined that the MTF data width value is 16 bits, the processing proceeds to step S113, at which the Huffman coding unit 37 sets the encoded data of the line header code to "7'b'1111001" and the code size to 7 bits. If it is determined that the MTF data width value is not 16 bits at step S112, the processing proceeds to step S114. At step S114, the Huffman coding unit 37 sets the encoded data of the line header code to "7'b'1111010" and the code size to 7 bits because the MTF data width value is 32 bits, in this case.

In the line header encoding process thus described, 3 bits on the LSB side of the encoded data of the line header code represents the MTF data width value.

After the completion of the processing at step S111, step S113, and step S114, the processing proceeds to step S115, at which the Huffman coding unit 37 performs a code output process.

Figure 22:
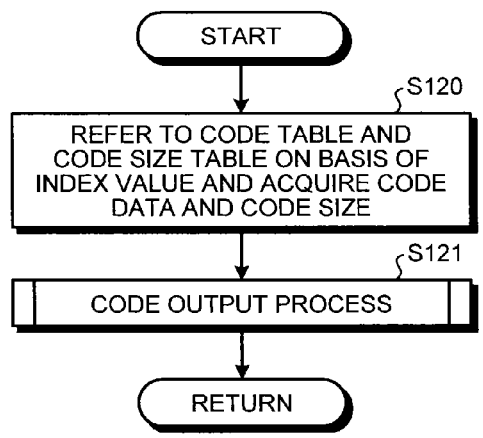
FIG. 22 is an exemplary flowchart illustrating an index encoding process.

FIG. 22 is an exemplary flowchart illustrating the index encoding process at step S103 of FIG. 20. At step S120, the Huffman coding unit 37 refers to the code table and the code size table that are exemplarily illustrated in FIG. 6 on the basis of the index value received from the MTF processing unit 36, and acquires the encoded data and the code size that correspond to the index value. For example, when receiving a value of "13" from the MTF processing unit 36 as the index value, the Huffman coding unit 37 refers to the code table and the code size table on the basis of the code name "INDEX13" corresponding to the index value. Then, the Huffman encoding unit 37 acquires the encoded data "0b1110100" and the code size "7" that correspond to the code name "INDEX13".

After the acquisition of the encoded data and the code size at step S120, the processing proceeds to step S121, at which the Huffman coding unit 37 performs the code output processing to output the acquired encoded data.

Figure 23:
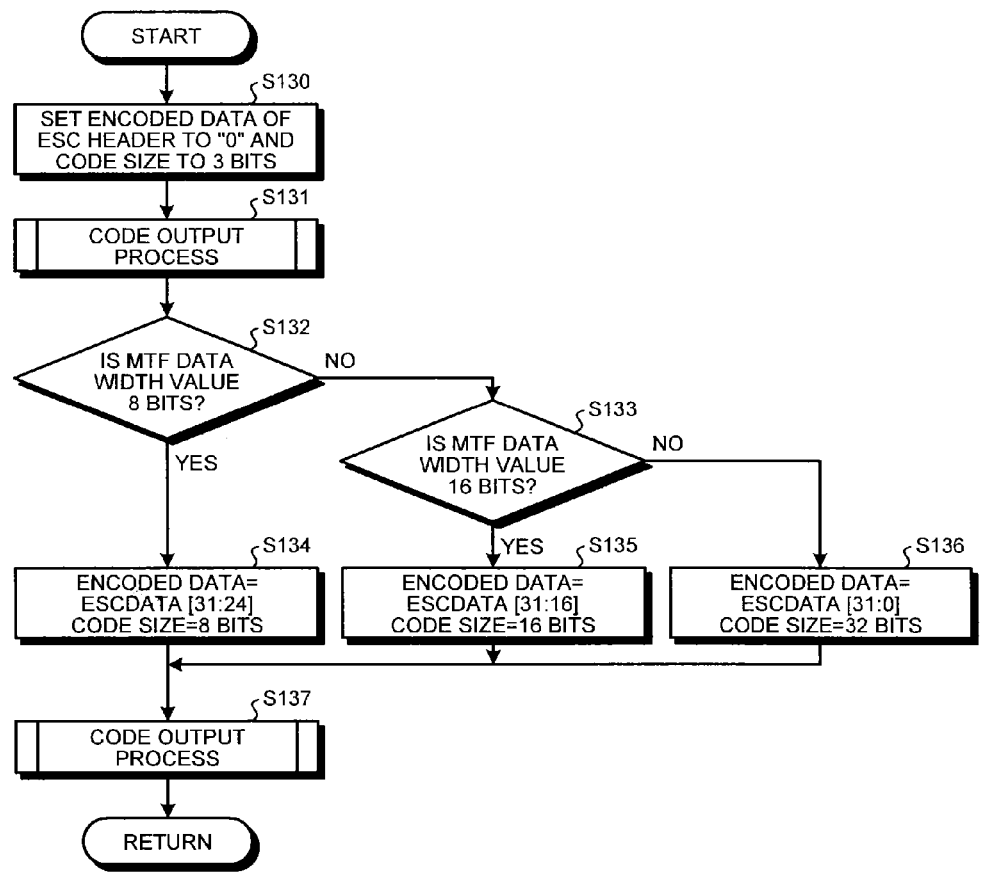
FIG. 23 is an exemplary flowchart illustrating an ESC encoding process.

FIG. 23 is an exemplary flowchart illustrating the ESC encoding process at step S104 of FIG. 20. At step S130, the Huffman coding unit 37 sets the encoded data of the ESC header to "0", which indicates that succeeding codes are the ESC data, and the code size to 3 bits. That is, the ESC header is set to a value of "0b000". At step S131, the Huffman coding unit 37 performs the code output process to output the ESC header.

From step S132 to step S106, the Huffman coding unit 37 cuts the encoded data from the ESC data in accordance with the MTF data width value. At step S132, the Huffman coding unit 37 determines whether the MTF data width value is 8 bits. If it is determined that the MTF data width value is 8 bits, the processing proceeds to step S134, at which the Huffman coding unit 37 cuts upper 8 bits from the ESC data and sets the cut data as the encoded data and the code size to 8 bits.

If it is determined that the MTF data width value is not 8 bits at step S132, the processing proceeds to step S133, at which the Huffman coding unit 37 determines whether the MTF data width value is 16 bits. If it is determined that the MTF data width value is 16 bits, the processing proceeds to step S135, at which the Huffman coding unit 37 cuts upper 16 bits from the ESC data and sets the cut data as the encoded data and the code size to 16 bits.

If it is determined that the MTF data width value is not 16 bits, i.e., the MTF data width value is 32 bits, the processing proceeds to step S136, at which the Huffman coding unit 37 sets the ESC data as the encoded data without any change and the code size to 32 bits.

After the acquisition of the encoded data and the code size at step S134, step S135, or step S136, the processing proceeds to step S137, at which the Huffman coding unit 37 performs the code output process.

Figure 24:
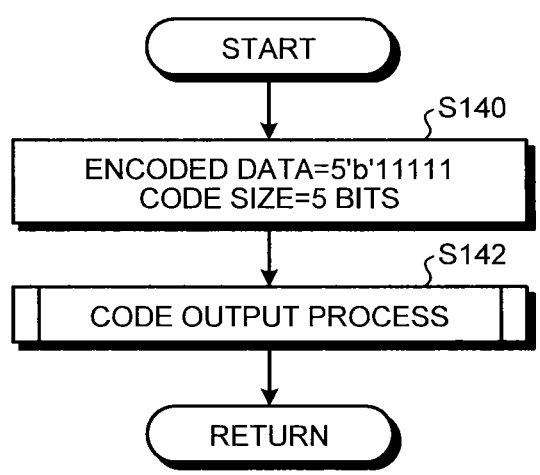
FIG. 24 is an exemplary flowchart illustrating a code end process.

FIG. 24 is an exemplary flowchart illustrating the end coding process at step S106 of FIG. 20. At step S140, the Huffman coding unit 37 sets the encoded data to "5'b'11111" and the code size to 5 bits. At step S142, the Huffman coding unit 37 performs the code output process.

Figure 25:
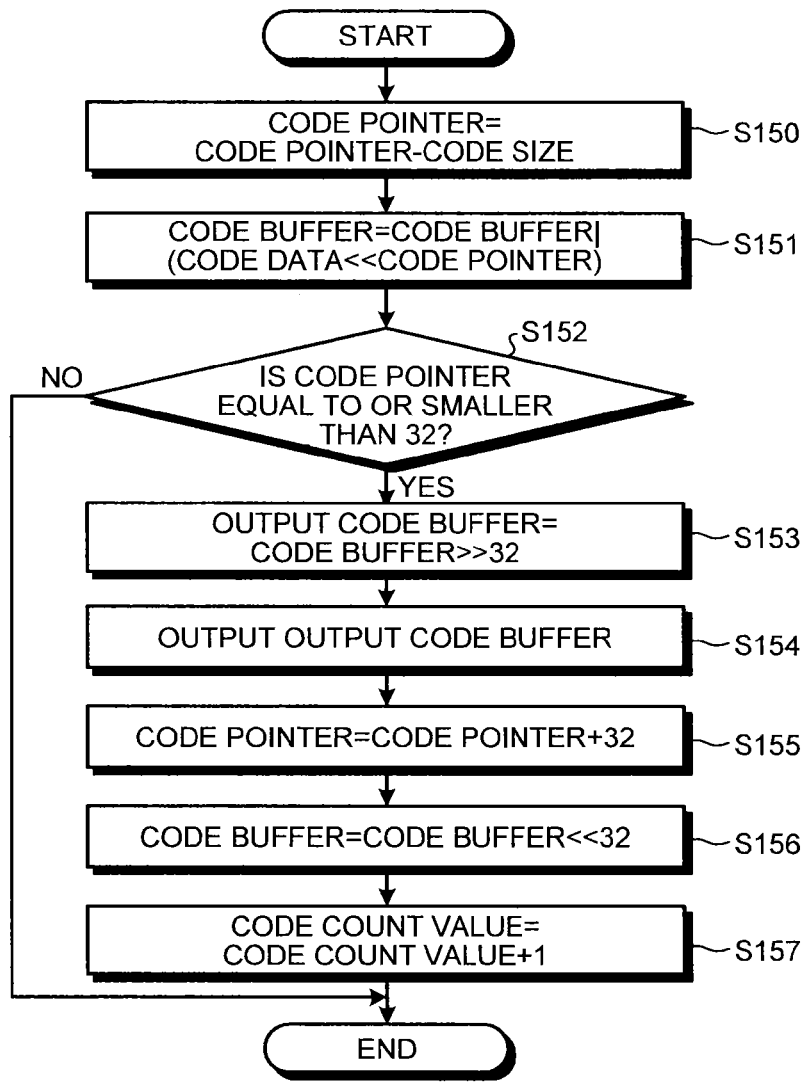
FIG. 25 is an exemplary flowchart illustrating a code output process.

FIG. 25 is an exemplary flowchart illustrating the code output process at step S115, step S121, step S137, and step S142. In the code output process, the encoded data, which is variable in code size, is summed to the word size (in this case, 32 bits), and the resultant data is output. A code buffer, the size of which is 64 bits, sequentially sums the encoded data having different code size. A code pointer indicates the end of an effective code in the code buffer.

At step S150, a value after subtraction of the code size from the code pointer is set to a new code pointer. That is, the code pointer is updated to provide an area equal to the code size for allowing the encoded data to be added to the code buffer. At step S151, the encoded data is added to the code buffer by being moved by the code pointer and positioned. At step S152, it is determined whether the code pointer≤32, and if the code pointer >32, the code output process ends.

On the other hand, if the code pointer ≤32, upper 32 bits of the code buffer are output during step S153 to step S157. Specifically, at step S153, the code buffer is shifted by 32 bits to the right to be set as an output code buffer, and at step S154, the output code buffer is output. At step S155, 32 is added to the code pointer, and at step S156, the code buffer is shifted by 32 bits to the left. At step S157, the code count value is counted up by one, and thereafter the code output process in the flowchart of FIG. 25 ends.

Pipeline Processing

Figure 26B:
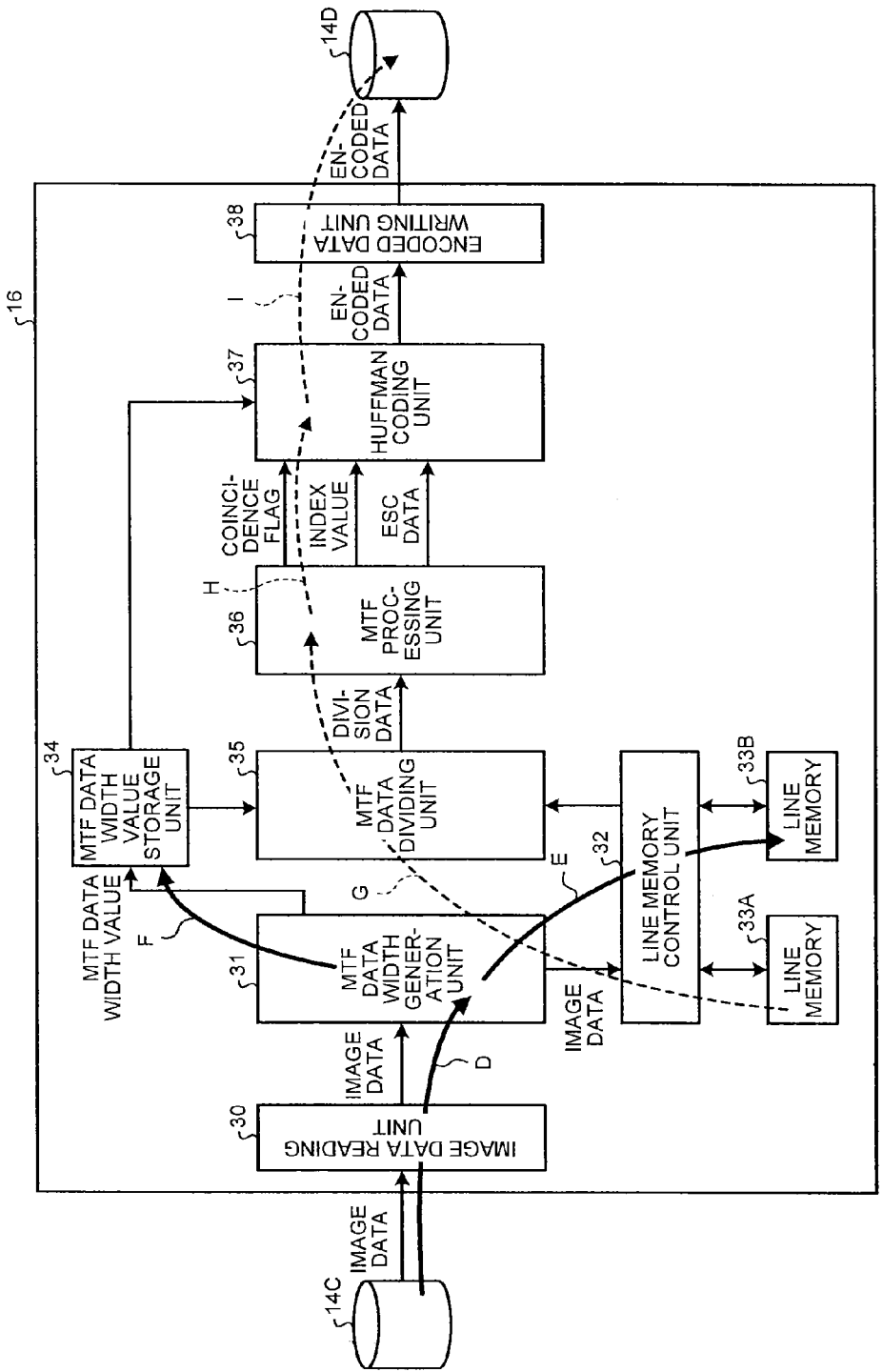

In the first embodiment, higher speed processing is achieved by pipeline processing. In this pipeline processing, in the encoding unit 16, the period detecting process by the MTF data width generation unit 31 and the encoding process by the MTF processing unit 36 and the Huffman coding unit 37 are performed using the two line memories 33A and 33B in a toggle manner (alternately). The pipeline processing in the first embodiment is described with reference to FIGS. 26A and 26B. In FIGS. 26A and 26B, the same units as FIG. 3 are labeled with the same numerals, and detail description thereof is omitted.

FIG. 26A illustrates a flow of the processing performed on an n-th line (line n). The image data reading unit 30 reads the image data of one word of the line n from the CMYK band image data area 14C of the main memory 14 through a route A, and the MTF data width generation unit 31 detects a plurality of periods in the read one word in parallel. The MTF data width generation unit 31 writes the image data of one word of the line n to the line memory 33A, for example, through a route B. The processing performed in word units is repeated until all of the words in one line are processed. When the processing of the line n is complete, the MTF data width generation unit 31 determines the data width corresponding to the longest period in the detected periods as the MTF data value, and causes the MTF data width value storage unit 34 to store therein the determined MTF data width data value through a route C.

FIG. 26B illustrates a flow of the processing performed on an (n+1)th line (line (n+1)). In the same manner as the line n, the MTF data width generation unit 31 detects a plurality of periods in the image data of one word of the line (n+1) read from the CMYK band image data area 14C of the main memory 14 through a route D in parallel. The MTF data width generation unit 31 writes the image data of one word of the line (n+1) to the line memory 33B through a route E. The processing performed in word units is repeated until all of the words in one line are processed. When the processing of the line (n+1) is complete, the MTF data width generation unit 31 determines the data width corresponding to the longest period in the detected periods as the MTF data value, and causes the MTF data width value storage unit 34 to store therein the determined MTF data width data value through a route F.

In parallel with the processing through the routes D, E, and F, the image data of the line n is read from the line memory 33A through a route G, and the MTF data dividing unit 35 divides the image data of the line n on the basis of the MTF data width value stored in the MTF data width value storage unit 34 through the route C. The division data of the line n is transferred to the MTF processing unit 36. The MTF processing unit 36 performs encoding by the MTF process on the basis of the division data of the line n, produces the coincidence flag, and the index value or the ESC data, and transfers the produced coincidence flag and the index value or the ESC data to the Huffman coding unit 37 through a route H. The Huffman coding unit 37 codes the coincidence flag and the index value or the ESC data received from the MTF processing unit 36 and transfers the encoded data to the encoded data writing unit 38 through a route I. The encoded data writing unit 38 writes the received encoded data into the CMYK page code data area 14D of the main memory 14. The processing performed on the line n through the routes G, H, and I is repeated until all of the words in the line n are processed.

The processing on the line n and the line (n+1) is performed repeatedly.

In this way, the processing to obtain the MTF data width value and the encoding process are performed in parallel on the image data of one line, thereby enabling the encoding process corresponding to the MTF data width value to be performed basically in one clock cycle. As a result, the processing can be performed with higher speed.

Decoding Process

Figure 27:
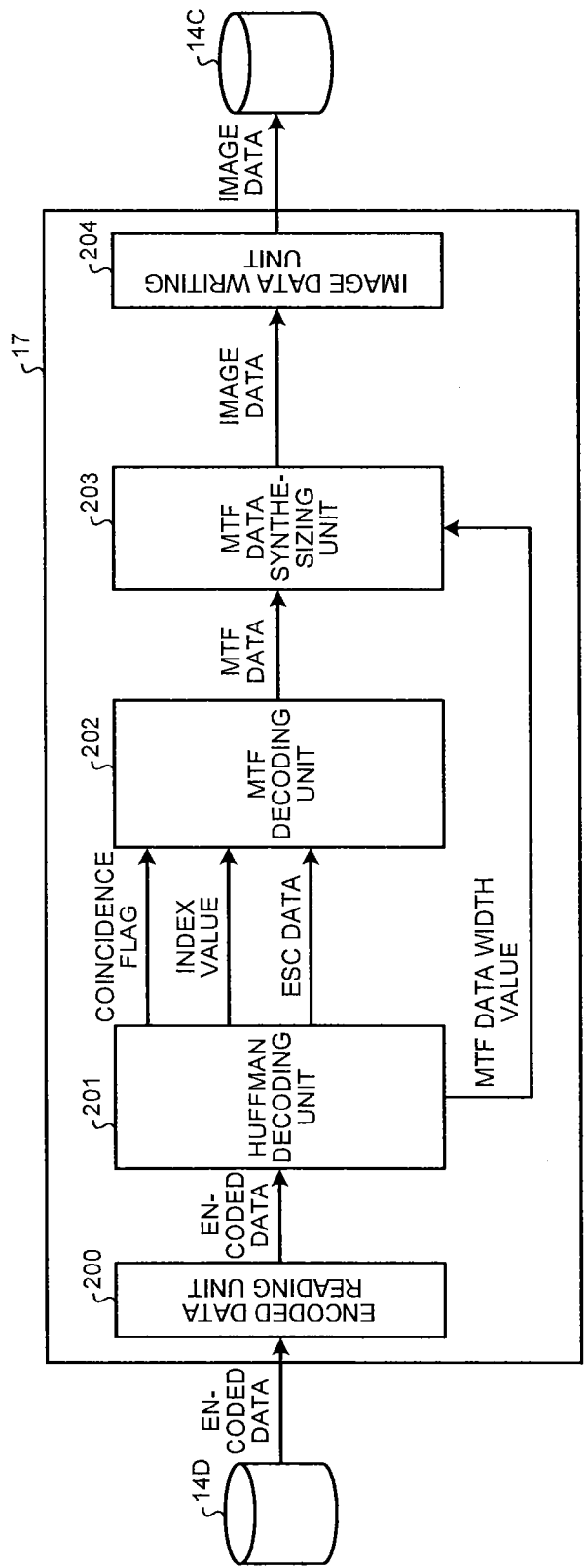
FIG. 27 is a block diagram illustrating an exemplary structure of a decoding unit in the first embodiment.

FIG. 27 illustrates an exemplary structure of the decoding unit 17 in the first embodiment. The decoding unit 17 includes an encoded data reading unit 200, a Huffman decoding unit 201, an MTF decoding unit 202, an MTF data synthesizing unit 203, and an image writing unit 204.

The encoded data reading unit 200 reads the encoded data from the CMYK page code data area 14D of the main memory 14 and transfers the read encoded data to the Huffman decoding unit 201. The Huffman decoding unit 201 decodes the encoded data received from the encoded data reading unit 200 in accordance with the format illustrated in FIG. 6 and acquires the coincidence flag, the index value, the ESC data, and the MTF data width value. The acquired coincidence flag, index value, and ESC data are transferred to the MTF decoding unit 202. The acquired MTF data width value is transferred to the MTF data synthesizing unit 203.

The decoding process performed by the Huffman decoding unit 201 is roughly described below. The Huffman decoding unit 201 sequentially reads the value of the encoded data received from the encoded data reading unit 200 bit by bit from MSB side of the encoded data, and determines the encoded data as any of the line header code, the ESC code, the index value, and the end code in accordance with the format of FIG. 6.

When determining that the received encoded data is the line header code, the Huffman decoding unit 201 determines the MTF data width value as any of 8 bits, 16 bits, and 32 bits on the basis of 3 bits on the LSB side of the encoded data. When determining that the received encoded data is the ESC code, the Huffman decoding unit 201 sets the value of the coincidence flag to a value indicating the non-coincidence (e.g., a value of "0"). Meanwhile, the Huffman decoding unit 201 cuts the data as the ESC data from the fourth bit of the encoded data by a bit length indicated by the MTF data width value determined from the line header code. When determining that the received encoded data is the index code, the Huffman decoding unit 201 obtains the index value in accordance with the format of FIG. 6. When determining that the received encoded data is the end code, the Huffman decoding unit 201 ends the decoding process.

The MTF decoding unit 202 receives the coincidence flag, the index value, and the ESC data from the Huffman decoding unit 201 and performs the decoding process on the basis of the MTF algorithm. Specifically, when the value of the coincidence flag is the value indicating the non-coincidence (e.g., a value of "0"), the MTF decoding unit 202 transfers the ESC data to the MTF data synthesizing unit 203 as the MTF data and stores the ESC data in the dictionary. When the value of the coincidence flag is the value indicating the coincidence (e.g. a value of "1"), the MTF decoding unit 202 refers to the dictionary in accordance with the index value and transfers the dictionary data corresponding to the index value to the MTF data synthesizing unit 203 as the MTF data. This MTF data corresponds to the division data divided by the MTF data dividing unit 35 of the encoding unit 16 by a predetermined data width.

The MTF data synthesizing unit 203 that synthesizes the MTF data received from the MTF decoding unit 202 on the basis of the MTF data width value received from the Huffman decoding unit 201 and produces the image data of in word units. The produced image data is transferred to the image writing unit 204, by which the image data is written into the CMYK band image data area 14C of the main memory 14.

Details of the Units of the Decoding Unit

Each unit of the decoding unit 17 is described in more detail below. The MTF decoding unit 202 is described below. The MTF decoding unit 202 makes the dictionary using the ESC data as the dictionary data, refers to the dictionary on the basis of the index value, and outputs the data corresponding to the index value.

Figure 28:
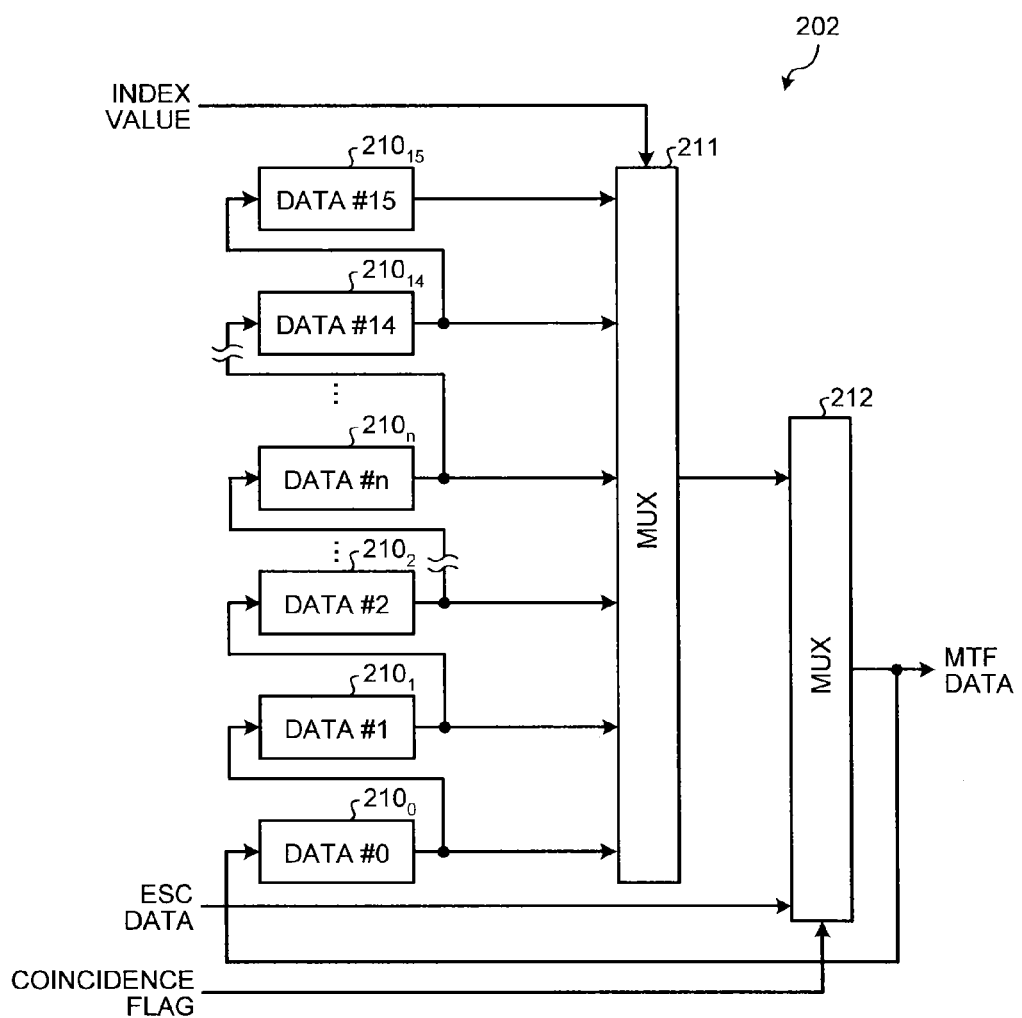
FIG. 28 is a block diagram illustrating an exemplary structure of an MTF decoding unit.

FIG. 28 illustrates an exemplary structure of the MTF decoding unit 202 to perform such processing. The MTF decoding unit 202 has a plurality of registers $210_0, 210_1, \ldots, 210_n$, and $210_{15}$ that store therein the dictionary data and constitute the dictionary, an MUX 211 that selects one of registers $210_0, 210_1, \ldots, 210_n, \ldots,$ and $210_{15}$ in accordance with the index value, and an MUX 212 that selects one of the ESC data and the data read from the registers $210_0, 210_1, \ldots, 210_n, \ldots,$ and $210_{15}$ on the basis of the coincidence flag and outputs the selected data. The input and output of each of the registers $210_0$ to $210_{15}$ are connected such that the output of a certain register is connected the input of the next adjacent register, thereby enabling the dictionary data to be shifted when the dictionary is updated.

When the coincidence flag received from the Huffman decoding unit 201 indicates the non-coincidence, the MTF decoding unit 202 outputs the ESC data received from the Huffman decoding unit 201 as the MTF data and stores the ESC data in the register $210_0$ as the dictionary data #0. When the coincidence flag indicating the non-coincidence and the ESC data are received, the MUX 212 moves the data stored in the register $210_0$ to the adjacent register $210_1$ and stores the newly received ESC data in the register $210_o$. In this way, the MTF decoding unit 202 sequentially stores the ESC data in the registers $210_0$ to $210_{15}$ as the dictionary data, thereby making the dictionary.

The ESC data has the data width formed, by the MTF data dividing unit 35 of the encoding unit 16, to the data width corresponding to the maximum period to be detected by the MTF data width generation unit 31 (in this case, 32 bits).

In the MTF decoding unit 202, the MUX 211 selects from the registers $210_0$ to $210_{15}$ the output corresponding to the index value received from the Huffman decoding unit 201. When the coincidence flag received from the Huffman decoding unit 201 indicates the coincidence, in the MTF decoding unit 202, the MUX 212 selects the output selected by the MUX 211 on the basis of the index value and outputs the selected output as the MTF data from the MTF decoding unit 202.

Figure 29:
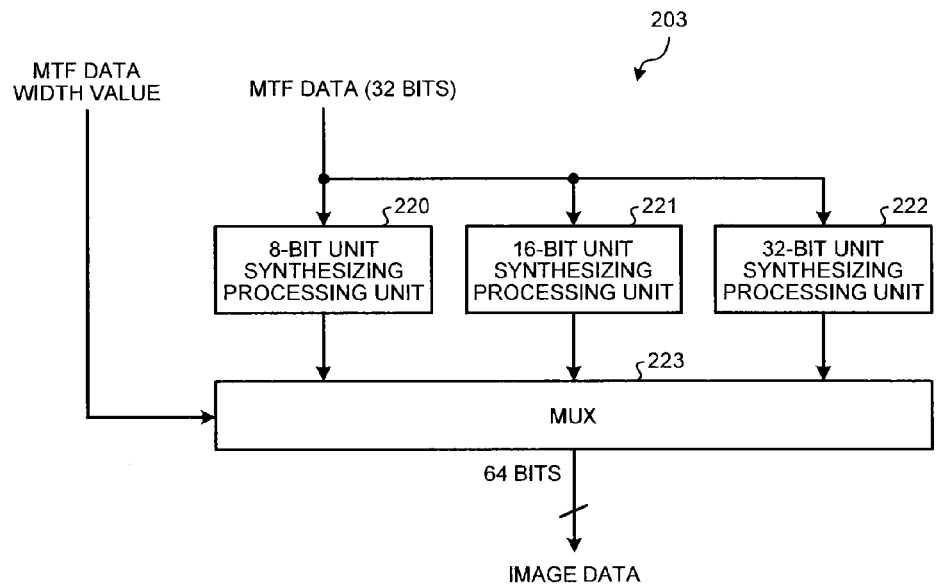
FIG. 29 is a block diagram illustrating an exemplary structure of an MTF data synthesizing unit.

FIG. 29 illustrates an exemplary structure of the MTF data synthesizing unit 203. The MTF data synthesizing unit 203 has an 8-bit unit synthesizing processing unit 220, a 16-bit unit synthesizing processing unit 221, a 32-bit unit synthesizing processing unit 222, and an MUX 223. The MTF data synthesizing unit 203 synthesizes data of one word from each of pieces of 8-bit, 16-bit, and 32-bit unit MTF data each of which is formed to have the data width of 32 bits, and outputs the synthesized data.

Figure 30:
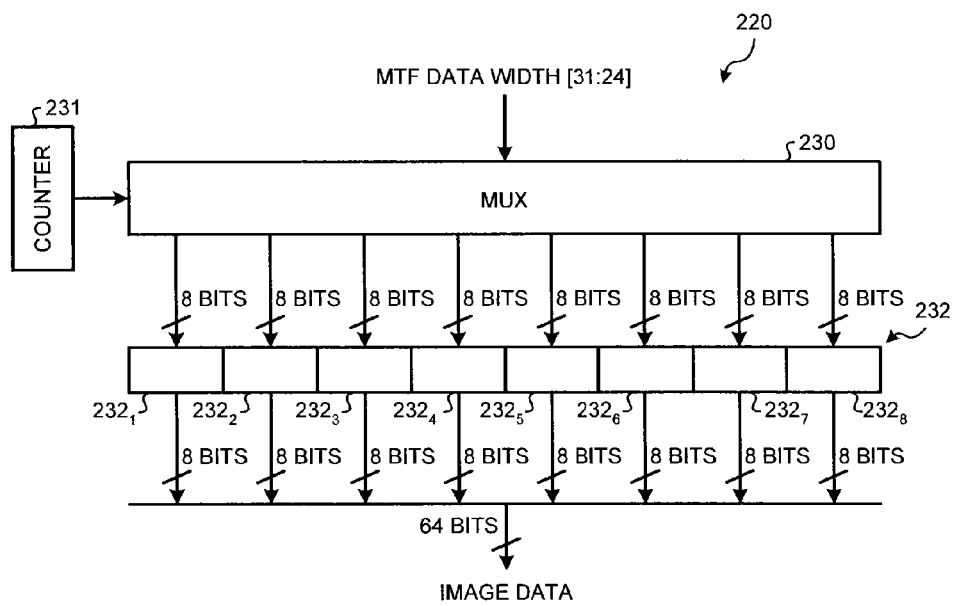
FIG. 30 is a block diagram illustrating an exemplary structure of an 8-bit unit synthesizing processing unit.

FIG. 30 illustrates an exemplary structure of the 8-bit unit synthesizing processing unit 220. The MTF data having a data width of 32 bits is input to an MUX 230. In FIG. 30, for example, a counter 231 counts from "1" to "8" every input of the MTF data to the MUX 230, and initializes the count value to "1" at the input operation timing after the count value becomes "8" and restarts the counting. A register 232, which stores the data in each of areas $232_1$, $232_2$, . . . , and $232_8$ in 8-bit units, can store therein the data of one word.

The MUX 230 cuts 8 bits on the MSB side of the input MTF data and stores the cut data of 8 bits in the area indicated by the count value of the counter 231 in the areas $232_1$ to $232_8$. When all of the areas $232_1$ to $232_8$ store the data, the data is simultaneously read from each of the areas $232_1$ to $232_8$ and the read data is output as the data of one word.

Figure 31:
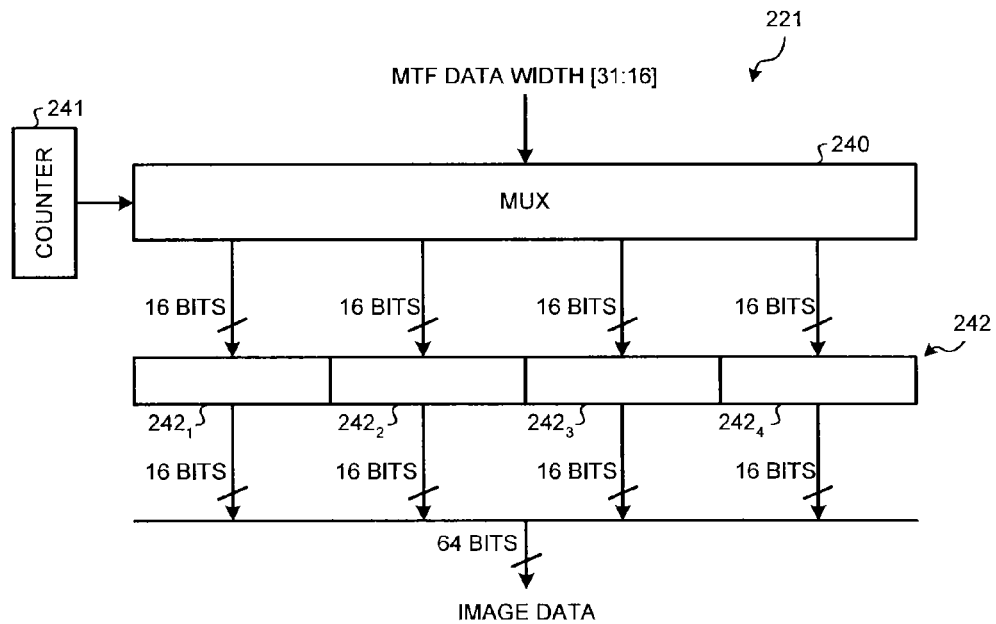
FIG. 31 is a block diagram illustrating an exemplary structure of a 16-bit unit synthesizing processing unit.

FIG. 31 illustrates an exemplary structure of the 16 bit unit synthesizing processing unit 221. The MTF data having a data width of 32 bits is input to an MUX 240. In FIG. 31, for example, a counter 241 counts from "1" to "4" every input of the MTF data to the MUX 240, and initializes the count value to "1" at the input operation timing after the count value becomes "4" and restarts the counting. A register 242, which stores the data in each of areas $242_1$ to $232_4$ in 16-bit units, can store therein the data of one word in all.

The MUX 240 cuts 16 bits on the MSB side of the input MTF data and stores the cut data of 16 bits in the area indicated by the count value of the counter 241 in the areas $242_1$ to $242_4$. When all of the areas $242_1$ to $242_4$ store the data, the data is simultaneously read from each of the areas $242_1$ to $242_4$ and the read data is output as the data of one word in all.

Figure 32:
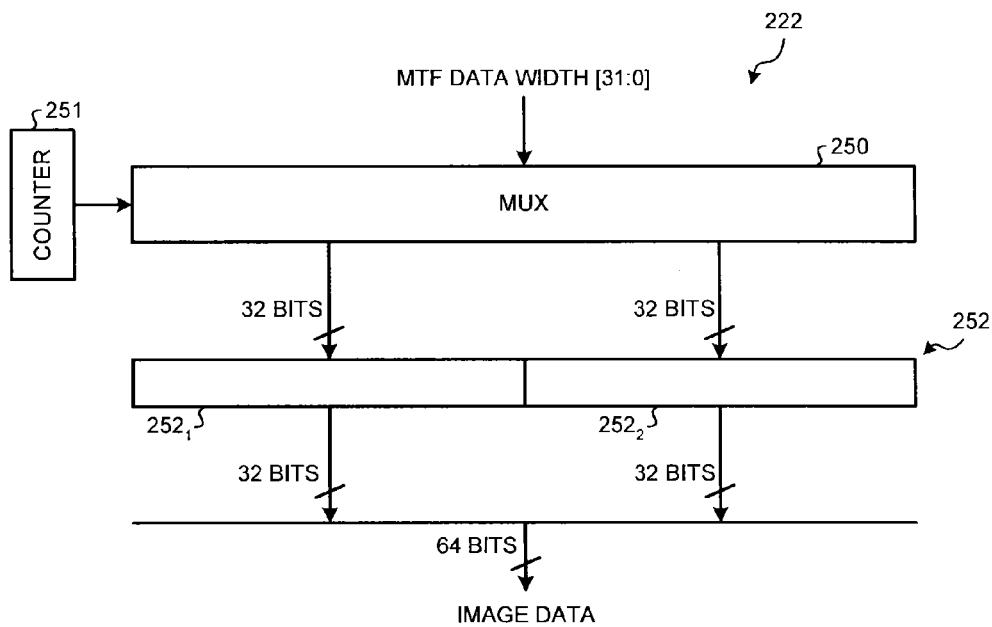
FIG. 32 is a block diagram illustrating an exemplary structure of a 32-bit unit synthesizing processing unit.

FIG. 32 illustrates an exemplary structure of the 32-bit unit synthesizing processing unit 222. The MTF data having a data width of 32 bits is input to an MUX 250. In FIG. 32, for example, a counter 251 counts from "1" to "2" every input of the MTF data to the MUX 250, and initializes the count value to "1" at the input operation timing after the count value becomes "2" and restarts the counting. A register 252, which stores the data in each of areas $252_1$ and $232_2$ in 32-bit units, can store therein the data of one word in all.

The MUX 250 stores the input MTF data in the area indicated by the count value of the counter 251 in the area $252_1$ or $252_2$. When both of the areas $252_1$ and $252_2$ store the data, the data is simultaneously read from each of the areas $252_1$ and $252_2$ and the read data is output as the data of one word.

Referring back to FIG. 29, the data of one word output from the 8-bit unit synthesizing processing unit 220, the 16-bit unit synthesizing processing unit 221, and the 32-bit unit synthesizing processing unit 222 is input to the MUX 223. The MUX 223 selects the output corresponding to the MTF data width value received from the Huffman decoding unit 201 out of the outputs of the 8-bit unit synthesizing processing unit 220, the 16-bit unit synthesizing processing unit 221, and the 32-bit unit synthesizing processing unit 222, and outputs the selected output as the image data of one word.

In the first embodiment, the image data is encoded using the MTF method. The coding of the image data, however, is not limited to the MTF method. For example, the first embodiment can be applied to a case when the coding is performed using a dictionary employing a simple first in first out (FIFO) method.

In the first embodiment, the MTF data width generation unit 31 detects the periods corresponding to the respective data widths of 8 bits, 16 bits, and 32 bits. The number of periods to be detected, however, is not limited to three. For example, the periods corresponding to two types of data width, such as 8 bits and 16 bits, may be detected. For another example, the periods corresponding to four or more types of data width may be detected.

As described above, in the first embodiment, the period detection is performed on the data to be encoded, the data is divided in accordance with the detected period to make the dictionary, the index value of the data is obtained by the MTF control of the made dictionary, and the obtained index value is subjected to the Huffman coding process. In this regard, the period detecting process and the encoding process (the MTF control and the Huffman coding process) are performed in parallel in line units using the two line memories in a toggle manner (alternately), in the first embodiment. As a result, the processing can be performed with high speed by hiding the processing time for the period detecting process.

In the period detecting process, a large amount of time is consumed in the period detecting process when the image data is read with a small period and the period is detected. As a result, it is difficult to efficiently perform the period detecting process and the encoding process in parallel.

When the period detecting process and the encoding process are performed on the basis of the identical numbers of bits, no problems arise because the period detecting process and the encoding process consume the same time. For the achievement of high speed processing, it is conceivable that the period detecting process is performed on the basis of a plurality of bit widths ranging from a small bit width to a large bit width. Even in such a case, the encoding process is performed on the basis of only the selected one period (bit width). Accordingly, even when the coding is performed originally on the basis of a large bit width, a short period in the periods detected in the period detection may become a bottleneck in the processing time and the high speed processing may be hardly achieved.

In view of such difficulty, in the period detecting process in the first embodiment, a plurality of pieces of period detecting process for detecting different periods are performed in parallel and the detection of the periods is performed in parallel on the basis of one word that is an accessing unit of the image data. Accordingly, the period detecting process on the basis of a small bit width (period) can be performed at the equivalent speed of that of the period detecting process on the basis of a large bit width (period), thereby enabling the high speed processing of the period detecting process to be achieved and the performing of the period detecting process with a faster speed than that of the encoding process to be guaranteed.

When the period detecting process and the encoding process are individually performed in line units, the period detecting process is performed by reading the image data from the main memory while the encoding process is performed by processing the data stored in the line memory. Accordingly, the encoding process completes the processing in a fixed period of time while the end time of the period detecting process varies depending on the time taken to read the data from the main memory. Because it is difficult to guarantee the time taken to read the data from the main memory due to the access to the main memory from other processing.

Basically, the period detecting process needs to complete a constitutive process per unit faster than that of the encoding process. In the period detecting process in the first embodiment, the period detecting process based on a small bit width (period) can be performed at the equivalent speed of that of the period detecting process based on a large bit width (period) because the detection of the periods is performed in parallel and the detection of the periods is performed in parallel on the basis of one word. As a result, the high speed processing of the period detecting process can be achieved, thereby enabling the period detecting process to balancing with the encoding process in processing time.

In the first embodiment, a plurality of periods, i.e., 8-bit width, 16-bit width, and 32-bit width, are detected in the period detecting process. If the data is divided on the basis of the periods detected in the period detecting process, the dictionary is prepared for each of the periods, and the MTF control is performed on each dictionary, the gate size of the hardware increases.

In each embodiment, only the dictionary having the size corresponding to the maximum period in the period detection (in the example of the first embodiment, the maximum period is 32-bit width) is prepared. The image data to be encoded is divided on the basis of the period detected through the period detection out of the periods, and the size of the division data is adjusted to the size of the dictionary by adding a predetermined value to the division data in accordance with the maximum period in the period detection. The MTF control is performed using the data having the size adjusted to the size of the dictionary, thereby enabling the period detecting process to be performed using only the dictionary having a single size. As a result, the gate size of the hardware can be reduced.

Second Embodiment

A second embodiment of the present invention is described below. In the second embodiment, a white line detecting process is added to the first embodiment. The white line is the line all pixels of which have a pixel value of "0". That is, when the image data of the white line is represented by a bit string, the values of all bits in the bit string are "0".

Figure 33:
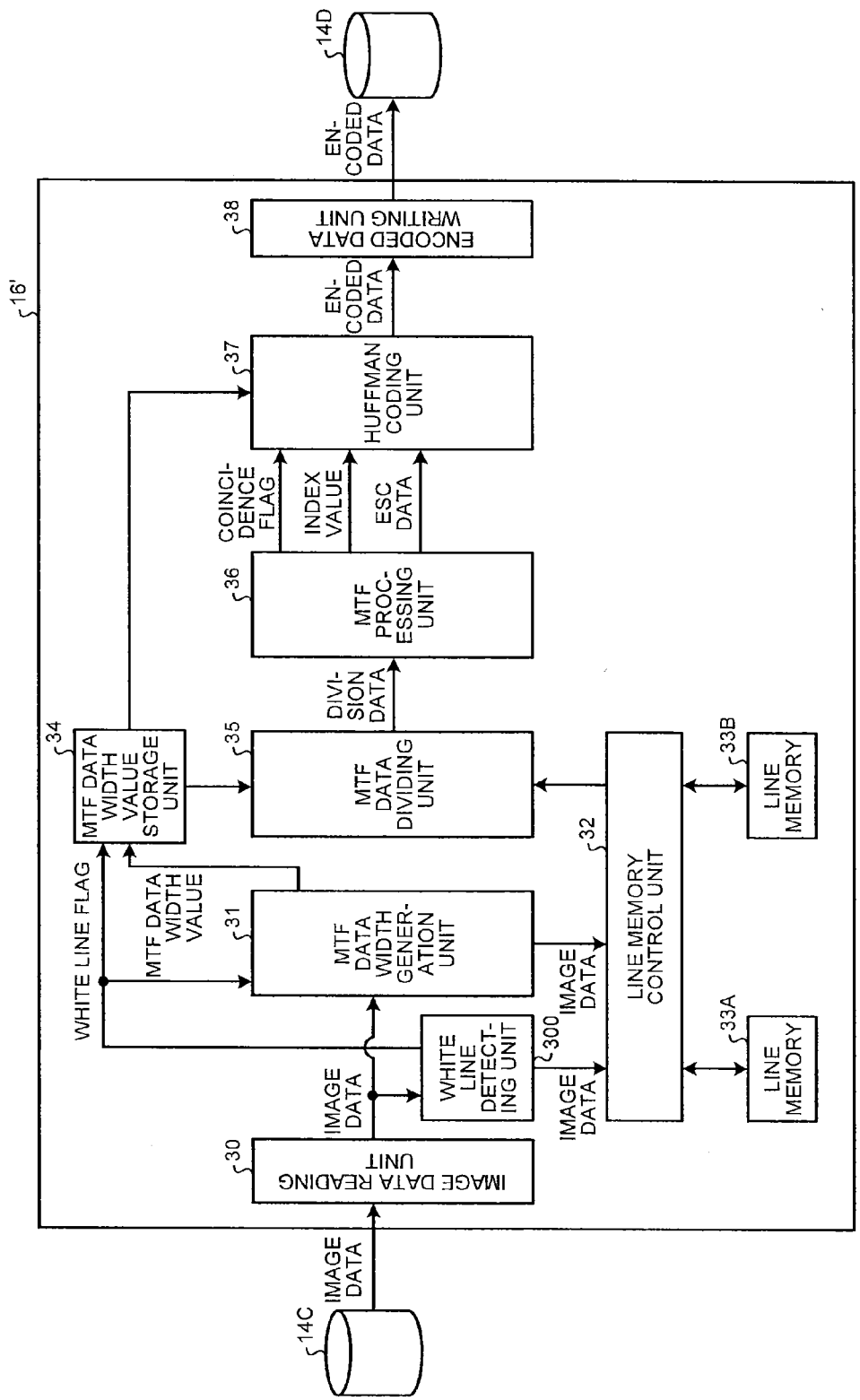
FIG. 33 is a block diagram illustrating an exemplary structure of an encoding unit according to a second embodiment.

FIG. 33 illustrates an exemplary structure of an encoding unit 16' in the second embodiment. In FIG. 33, the same elements as FIG. 3 are labeled with the same numerals, and detail description thereof is omitted. As exemplarily illustrated in FIG. 33, the encoding unit 16' in the second embodiment has a structure obtained by adding a white line detecting unit 300 to the encoding unit 16 in the first embodiment.

The image data read by the image data reading unit 30 from the CMYK band image data area 14C of the main memory 14 is transferred to the MTF data width generation unit 31 and the white line detecting unit 300. The white line detecting unit 300 detects white pixel (i.e., the values of all bits of the pixel are "0") in the received image data and determines whether the white pixel continues from the head of the line. The white line detecting unit 300 transfers the image data to the line memory control unit 32 in word units during the continuation of the white pixel from the head of the line, for example. The line memory control unit 32 writes the white image data into the line memory 33A or 33B.

When the whole of one line is the white pixel as the detecting result of the continuation of the white pixel, the white line detecting unit 300 outputs a white line flag having a value indicating the result (e.g., a value of "1"). The output white line flag is stored in the MTF data width value storage unit 34 and also transferred to the MTF data width generation unit 31.

When the value of the white line flag stored in the MTF data width value storage unit 34 is the value indicating that the whole of line is the white pixel (hereinafter, called as the value indicating a whole white line), the MTF data dividing unit 35 sets the MTF data width value to a value corresponding to the maximum period to be detected by the MTF data width generation unit 31 in the period detecting process (in this case, 32 bits) as a fixed value.

On the other hand, when the value of the white line flag stored in the MTF data width value storage unit 34 is the value indicating that the line includes at least a pixel having a color different from white (hereinafter, called as the value indicating a non-whole white line), the MTF data dividing unit 35 sets the MTF data width value to a value corresponding to the period detected by the MTF data width generation unit 31 in the period detecting process.

FIG. 34 is an exemplary flowchart illustrating an encoding process in the second embodiment. The encoding unit 16' initializes the white line flag (WFLAG) to the value indicating the whole white line (in this case, a value of "1") at step S200. At step S201, the image data reading unit 30 reads one word of the image data of one line from the CMYK band image data area 14C of the main memory 14.

At step S202, the MTF data width generation unit 31 determines whether the value of the white line flag is the value indicating the whole white line (a value of "1"). If it is determined that the value of the white line flag is the value indicating the non-whole white line (a value of "0"), the processing proceeds to step S205. At step S205, the MTF data width generation unit 31 performs the period detecting process on the image data received from the image data reading unit 30 and obtains the MTF data width value. The MTF data width value is stored in the MTF data width value storage unit 34. Then, the processing proceeds to step S206.

On the other hand, if it is determined that the value of the white line flag is the value indicating the whole white line at step S202, the processing proceeds to step S203, at which the white line detecting unit 300 determines whether the value of the image data received from the image data reading unit 30 is "0", i.e., whether the values of all bits of the image data are "0". If it is determined that the value of the image data is "0", the processing proceeds to step S206.

On the other hand, if it is determined that the value of the image data is not "0", i.e., the value of at least one of the bits of the image data is not "0", the processing proceeds to step S204, at which the value of the white line flag is set to the value indicating the non-whole white line (a value of "0"). Then, the processing proceeds to step S206.

At step S206, the image data is written into the line memory 33A or 33B under the control of the line memory control unit 32. In this flow, the image data is written into the line memory 33A.

The image data is transferred to the line memory control unit 32 from the white line detecting unit 300 and written into the line memory 33A in the following cases: the case when it is determined that the value of the image data is "0" at step S203 and the processing proceeds to step S206, and the case when it is determined that the value of the image data is not "0" at step S203 and the processing proceeds to step S206 after proceeding to step S204. On the other hand, when it is determined that the value of the white line flag is the value indicating the non-whole white line and the processing proceeds to step S206, the image data is transferred to the line memory control unit 32 from the MTF data width generation unit 31 and written into the line memory 33A.

The processing proceeds to step S207, at which the encoding unit 16' determines whether the processing of the image data of one line is complete. If it is determined that the processing is not complete, the processing returns to step S201, at which next one word of the image data of the line in processing is read.

On the other hand, if it is determined that the processing of the image data of one line is complete at step S207, the processing proceeds to step S208. At step S208, the MTF data dividing unit 35 determines whether the value of the white line flag stored in the MTF data width value storage unit 34 is the value indicating the whole white line.

If it is determined that the value of the white line flag is the value indicating the whole white line, the processing proceeds to step S209, at which the MTF data dividing unit 35 uses the data width corresponding to the maximum period to be detected by the MTF data width generation unit 31 in the period detecting process (in this case, 32 bits) as the MTF data width. On the other hand, if it is determined that the value of the white line flag is the value indicating the non-whole white line, the processing proceeds to step S209, at which the MTF data dividing unit 35 uses the data width corresponding to the period detected by the MTF data width generation unit 31 in the period detecting process as the MTF data width.

After the MTF data width is determined at step S209 or step S210, the processing proceeds to step S211. At step S211, the MTF data dividing unit 35 divides the image data read from the line memory 33A into pieces of data by the MTF data width determined at step S209 or step S210. At step S212, the MTF processing unit 36 performs the MTF process, and at step S213, the Huffman coding unit 37 performs the Huffman coding in accordance with the format described with reference to FIG. 6. The processing performed from step S211 to step S213 is the same as the corresponding processing in the first embodiment, and thus the description thereof is omitted.

After the Huffman coding process is complete at step S213, the processing proceeds to step S214, at which it is determined whether the processing of the image data of one line is complete. If it is determined that the processing is not complete, the processing returns to step S211, at which the processing is performed on the next image data of one word. On the other hand, if it is determined that the processing of the image data of one line is complete, the processing proceeds to step S215, at which it is determined whether the processing of the image data is complete on all lines (e.g., all lines corresponding to the band height). If it is determined that the processing is not complete, the processing returns to step S200, at which the processing is performed on the image data of the next line. On the other hand, if it is determined that the processing of the image data of all lines is complete, the coding processing of the flowchart of FIG. 34 ends.

Pipeline Processing in Second Embodiment

Also in the second embodiment, higher speed processing is achieved by pipeline processing. In this pipeline processing, in the encoding unit 16', the period detecting process by the MTF data width generation unit 31, and the encoding process by the MTF processing unit 36 and the Huffman coding unit 37 are performed using the line memories 33A and 33B in a toggle manner (alternately). In the pipeline processing, the processing flow differs between a case when the white pixel is continuously detected from the head of one line and a case after the discontinuation of the white pixel continuing from the head of one line.

The pipeline processing in the second embodiment is described with reference to FIGS. 35A to 35D. In FIGS. 35A to 35D, the same units as FIGS. 3 and 33 are labeled with the same numerals, and detail description thereof is omitted.

Figure 35A:
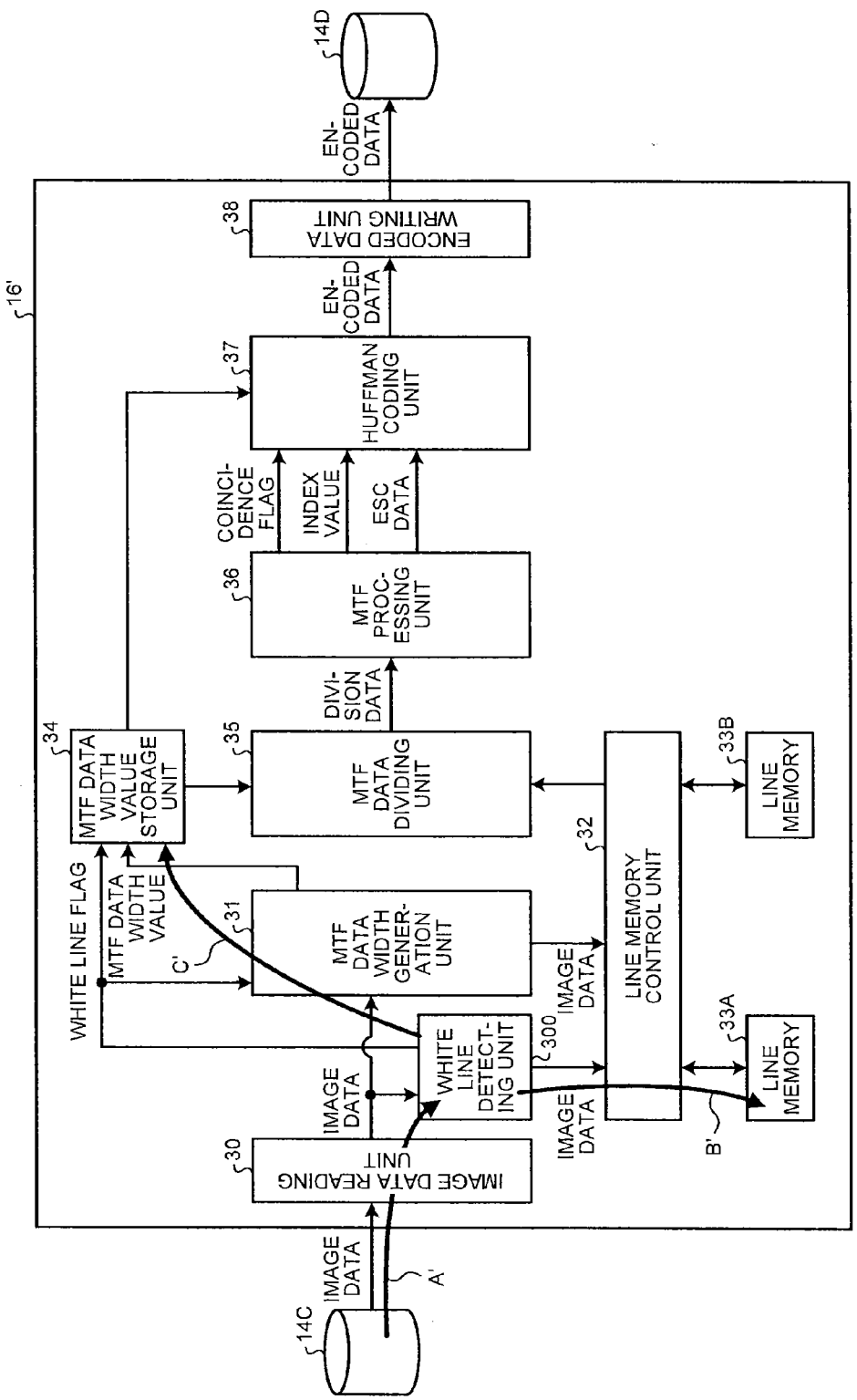
FIGS. 35A to 35D are schematic diagrams to explain pipeline processing in the second embodiment.

FIG. 35A illustrates the processing flow when the white pixel is continuously detected from the head of the line n in the processing of the line n. In the processing of the line n, the image data reading unit 30 reads the image data of one word of the line n from the CMYK band image data area 14C of the main memory 14 through a route A' and the white line detecting unit 300 determines whether the value of the read image data is "0". If it is determined that the value of the image data is "0", the image data of one word of the line n is written into the line memory 33A, for example, through a route B'. The white line detecting unit 300 sets the value of the white line flag to the value indicating the whole white line and causes the MTF data width value storage unit 34 to store therein the set value through a route C'.

Figure 35B:
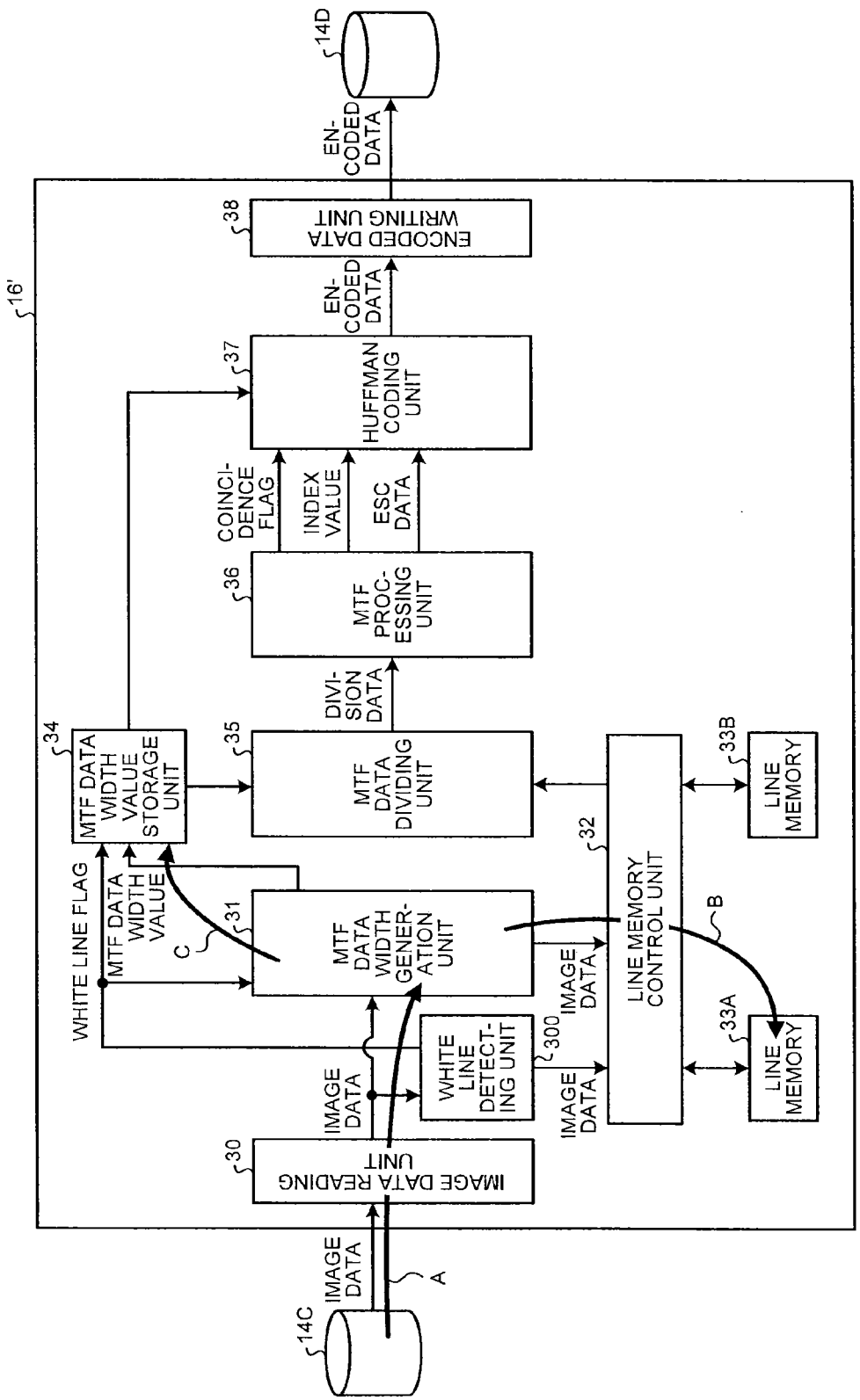

FIG. 35B illustrates the processing flow after the discontinuation of white pixel continuously detected from the head of the line n when the value of the white line flag changes to the value indicating the non-whole white line in the processing of the line n. In this case, the processing flow is the same as that described with reference to FIG. 26A. As for the image data of the line n, the MTF data width generation unit 31 detects a plurality of periods in parallel in the image data of one word of the line n read by the image data reading unit 30 from the CMYK band image data area 14C through the route A. The image data of one word of the line n is written into the line memory 33A through the route B. The processing performed in word units is repeated until all of the words in one line are processed. When the processing on the line n is complete, the MTF data width generation unit 31 determines the data width corresponding to the longest period in the detected periods as the MTF data value, and causes the MTF data width value storage unit 34 to store therein the determined MTF data width data value through the route C.

Figure 35C:
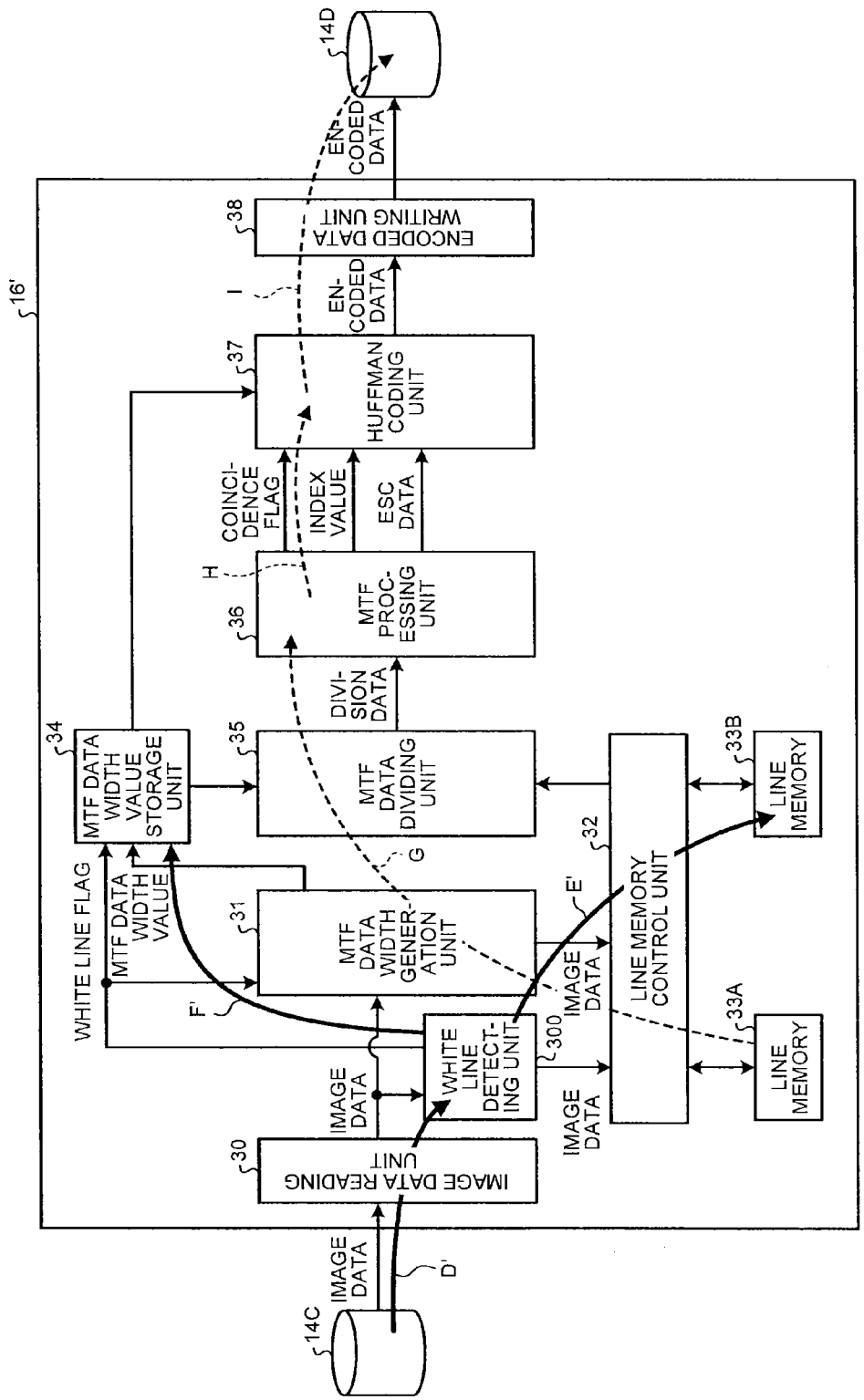

FIG. 35C illustrates the processing flow when the white pixel is continuously detected from the head of a line (n+1) in the processing of the line (n+1). In the image data of the line (n+1), the white line detecting unit 300 determines on the image data of one word of the line (n+1) read from the CMYK band image data area 14C through a route D' whether the value of the image data is If it is determined that the value of the image data is "0", the image data of one word of the line (n+1) is written into the line memory 33B through a route E'. The white line detecting unit 300 sets the value of the white line flag to the value indicating the whole white line and causes the MTF data width value storage unit 34 to store therein the set value through a route F'.

In parallel with the processing through the routes D', E', and F', the image data of the line n is read from the line memory 33A through the route G, the MTF data dividing unit 35 divides the image data of the line n on the basis of the MTF data width value stored in the MTF data width value storage unit 34 through the route C', and the division data is transferred to the MTF processing unit 36, in the same manner as the processing flow described with reference to FIG. 26B. The MTF processing unit 36 performs coding by the MTF process on the basis of the division data of the line n, produces the coincidence flag, and the index value or the ESC data, and transfers the produced coincidence flag and the index value or the ESC data to the Huffman coding unit 37 through the route H. The Huffman coding unit 37 codes the coincidence flag and the index value or the ESC data received from the MTF processing unit 36 and transfers the encoded data to the encoded data writing unit 38 through the route I. The encoded data writing unit 38 writes the received encoded data into the CMYK page code data area 14D of the main memory 14. The processing performed on the line n through the routes G, H and I is repeated until all of the words in the line n are processed.

Figure 35D:
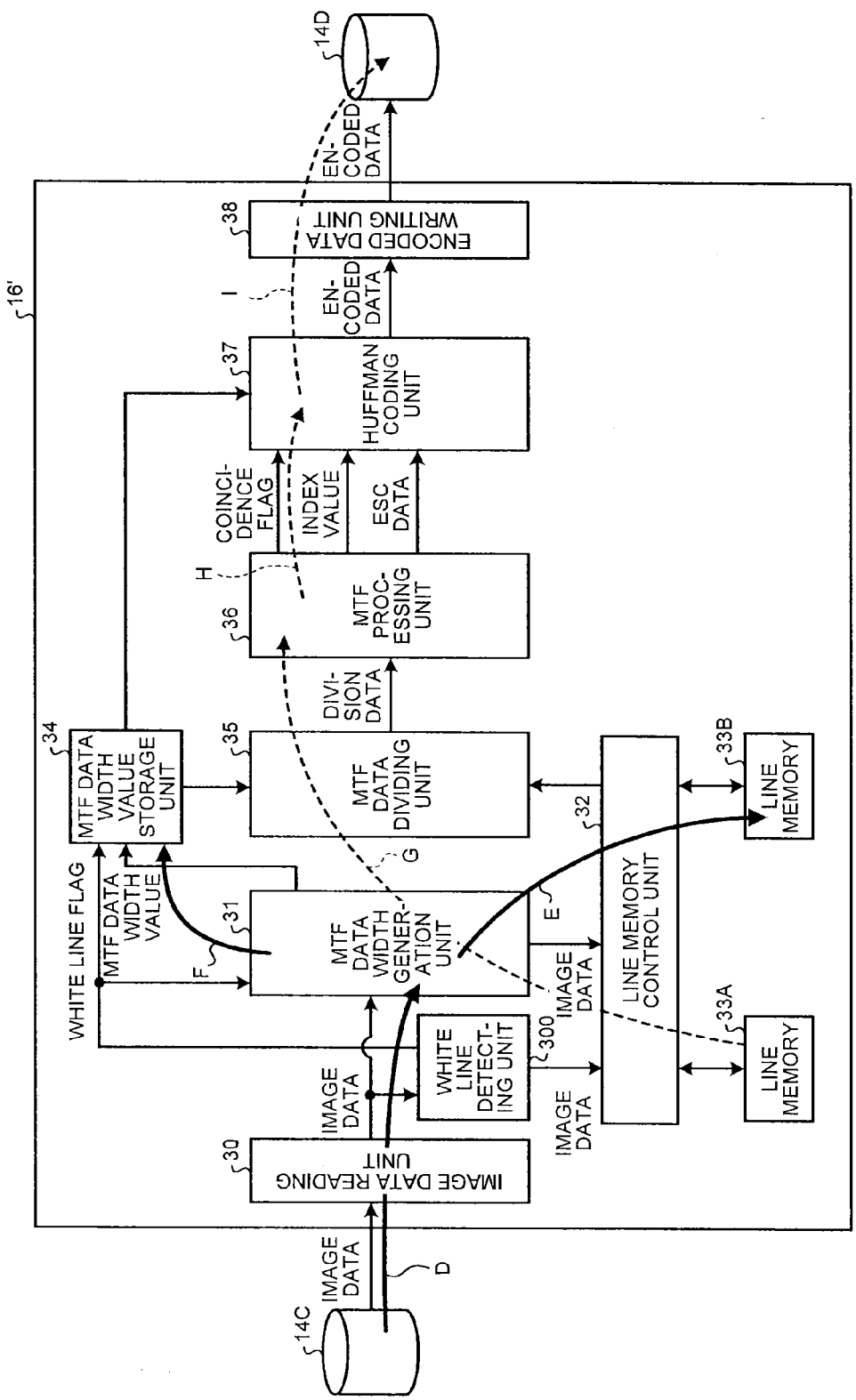

FIG. 35D illustrates the processing flow after the discontinuation of the white pixel continuously detected from the head of the line (n+1) when the value of the white line flag changes to the value indicating the non-whole white line in the processing of the line (n+1). In this case, the processing flow is the same as that described with reference to FIG. 26B. As for the image data of the line (n+1), the MTF data width generation unit 31 detects a plurality of periods in the image data of one word of the line (n+1) read from the CMYK band image data area 14C of the main memory 14 through the route D in parallel, in the same manner as the line n. The image data of one word of the line (n+1) is written into the line memory 33B through the route E. The processing performed in word units is repeated until all of the words in one line are processed. When the processing on the line (n+1) is complete, the MTF data width generation unit 31 determines the data width corresponding to the longest period in the detected periods as the MTF data value, and causes the MTF data width value storage unit 34 to store therein the determined MTF data width data value through the route F.

In parallel with the processing through the routes D, E, and F, the image data of the line n is read from the line memory 33A through the route G, and the MTF data dividing unit 35 divides the image data of the line n on the basis of the MTF data width value stored in the MTF data width value storage unit 34 through the route C', and transfers the division data to the MTF processing unit 36. The MTF processing unit 36 performs encoding by the MTF process on the basis of the division data of the line n, produces the coincidence flag, and the index value or the ESC data, and transfers the produced coincidence flag and the index value or the ESC data to the Huffman coding unit 37 through the route H. The Huffman coding unit 37 codes the coincidence flag and the index value or the ESC data received from the MTF processing unit 36 and transfers the encoded data to the encoded data writing unit 38 through the route I. The encoded data writing unit 38 writes the received encoded data into the CMYK page code data area 14D of the main memory 14. The processing performed on the line n through the routes G, H, and I is repeated until all of the words in the line n are processed.

As describe above, in the second embodiment, the continuation of white pixel from the head of the read image data of one line is detected, and the image data is written into the line memory without performing the period detecting process during time in which the white pixel continues. The read image data is written into the line memory without any change and without performing the period detecting process in the white lines, thereby enabling the image data to be read with high speed.

When the pixel values of all pixels of one line are "0", the processing of the line can be performed as whole white line detecting process, thereby enabling the compression coding process to be performed with high speed. That is, when it is detected that the whole line is composed of the white pixels, the MTF data dividing unit 35 divides the image data into pieces of data with the data width corresponding to the maximum period to be detected through the period detecting process. When the whole line is composed of the white pixels, the compression coding process can be performed with the data width corresponding to the maximum period, thereby enabling processing speed to be increased and compression ratio to be high compression ratio (a small value).

In addition, in the second embodiment, when the continuation of the white pixel ends halfway in one line, the image data during the continuation of the white pixel is stored in the line memory and the period detecting process starts from data after the discontinuation of the white pixel. Accordingly, the compression coding process can be performed with high speed during the continuation of the white pixel. That is, the period detecting process is not particularly required during the continuation of the white pixel because the image data of white pixels can be divided into pieces of data by any period.

According to the embodiments, it is possible to provide an advantage of more efficiently performing the compression coding of the image data.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a detecting unit configured to detect different predetermined periods in parallel in image data line by line;
a selecting unit configured to select a longest period in the periods that are acquired by the detecting unit through detection of the periods with respect to a piece of image data corresponding to one line;
a dividing unit configured to divide the piece of image data corresponding to the one line into pieces of division data in accordance with the period selected by the selecting unit;
a converting unit configured to convert each of the pieces of division data into a piece of intermediate data, the division data being obtained by dividing the piece of image data corresponding to the one line by the dividing unit; and
an encoding unit configured to perform compression coding on the piece of intermediate data converted by the converting unit.

2. The image processing apparatus according to claim 1, wherein a process that is performed on a piece of image data corresponding to a first line by the converting unit and the encoding unit is performed in parallel with a process that is performed on a piece of image data corresponding to a second line succeeding the first line by the detecting unit.

3. The image processing apparatus according to claim 1, wherein the converting unit converts each of the pieces of division data into the piece of intermediate data having a data length corresponding to the longest period in the periods detected by the detecting unit.

4. The image processing apparatus according to claim 1, further comprising a white detecting unit configured to detect white data in the piece of image data corresponding to the one line, wherein
the detecting unit identifies that a predetermined period is detected in the piece of image data corresponding to the one line when the white detecting unit detects that the whole piece of image data corresponding to the one line is the white data.

5. The image processing apparatus according to claim 4, wherein, when the white detecting unit detects data other than the white data in the piece of image data corresponding to the one line, the detecting unit starts detecting the periods at the time of the detection of the data other than the white data.

6. The image processing apparatus according to claim 4, wherein the predetermined period is the longest period in the periods detected by the detecting unit.

7. The image processing apparatus according to claim 1, wherein the converting unit converts each of the pieces of division data into the piece of intermediate data in a dictionary style.

8. The image processing apparatus according to claim 1, further comprising an output unit configured to output encoded data produced through the compression coding by the encoding unit, line by line, wherein
the output unit adds identification information for identifying the corresponding line and a value indicating the period selected by the selecting unit to a head of the encoded data and outputs the resultant encoded data.

9. The image processing apparatus according to claim 1, wherein
the image data is represented by a bit string, and
each of the periods is a period of a bit value included in the bit string.

10. An image forming apparatus comprising:
the image processing apparatus according to claim 1;
a storage unit configured to store therein encoded data obtained through the compression coding by the encoding unit;
a decoding unit configured to decode the encoded data stored in the storage unit to image data; and
an image forming unit configured to form an image on a printing medium on the basis of the image data decoded by the decoding unit.

11. An image processing method comprising:
detecting, by a detecting unit, different predetermined periods in parallel in image data line by line;
selecting, by a selecting unit, a longest period in the periods that are acquired by the detecting unit through detection of the periods with respect to a piece of image data corresponding to one line;
dividing, by a dividing unit, the piece of image data corresponding to the one line into pieces of division data in accordance with the period selected by the selecting unit;
converting, by a converting unit, each of the pieces of division data into a piece of intermediate data, the division data being obtained by dividing the piece of image data corresponding to the one line by the dividing unit; and
performing, by an encoding unit, compression coding on the piece of intermediate data converted by the converting unit.

* * * * *